United States Patent [19]
Casabona et al.

[11] Patent Number: 5,872,540
[45] Date of Patent: Feb. 16, 1999

[54] DIGITAL INTERFERENCE SUPPRESSION SYSTEM FOR RADIO FREQUENCY INTERFERENCE CANCELLATION

[75] Inventors: Mario M. Casabona, Cedar Grove; Murray W. Rosen, Parsippany; Bernard W. Hurley, Franklin, all of N.J.

[73] Assignee: Electro-Radiation Incorporated, Fairfield, N.J.

[21] Appl. No.: 883,077

[22] Filed: Jun. 26, 1997

[51] Int. Cl.[6] .............................. H01Q 21/04; G01S 3/16; H04B 1/10; H04B 15/00

[52] U.S. Cl. .......................... 342/362; 342/379; 375/346; 375/349; 455/283; 455/296

[58] Field of Search ..................................... 342/378, 362, 342/361; 375/346, 349; 455/296, 283

[56] References Cited

U.S. PATENT DOCUMENTS

| | | |
|---|---|---|
| 3,421,091 | 1/1969 | Brown et al. . |
| 3,883,872 | 5/1975 | Fletcher et al. . |
| 4,283,795 | 8/1981 | Steinberger . |
| 4,937,582 | 6/1990 | Mohuchy . |
| 5,036,331 | 7/1991 | Dallabetta et al. .................... 342/361 |
| 5,268,927 | 12/1993 | Dimos et al. . |
| 5,298,908 | 3/1994 | Piele . |
| 5,311,192 | 5/1994 | Varga et al. . |
| 5,485,485 | 1/1996 | Briskman et al. . |
| 5,515,057 | 5/1996 | Lennen et al. . |
| 5,596,600 | 1/1997 | Dimos et al. ........................... 375/346 |
| 5,691,727 | 11/1997 | Cyzs ........................................ 342/362 |
| 5,712,641 | 1/1998 | Casabona et al. ..................... 342/362 |
| 5,796,779 | 8/1998 | Nussbaum et al. .................... 375/346 |

OTHER PUBLICATIONS

New Product Announcement—GPS Interference Suppression Unit, Electro–Radiation Incorporated, 39 Plymouth Street, Fairfield, NJ 07004, Donald W. Hiorth, V.P. Business Development, Sep. 7, 1995.

Proceedings of the National Technical Meeting; Technology and Operations: Partnership for Success in Navigation, Jan. 22–24, 1996, Santa Monica, CA.

*Primary Examiner*—Gregory C. Issing
*Attorney, Agent, or Firm*—Jacobson, Price, Holman & Stern, PLLC

[57] ABSTRACT

A digital signal processing system that produces an adaptive cancellation arrangement which nulls out all types of concurrent interference and/or jamming signals received by a Global Positioning System (GPS) or spread spectrum receiver from diverse antennas. The present invention uses a unique adaptive interference suppression technique to convert and digitize the analog input signals, and numerically modulate the data to produce effective cancellation of interference signals by nulling while preserving the multiple underlying spread spectrum signals. The invention generates digital and analog output signals which contain a reduced amount of interference. In the present arrangement, orthogonal components of the composite received signal are separated by the receive antenna arrangement and adjusted in the digital network between the antenna and receiver in phase and amplitude to optimally cancel components. The arrangement can be synergistically combined with digital adaptive transversal filter technology which is primarily used to supplement suppression performance by reducing narrowband interferences in the band. The orthogonal received signal components from the GPS satellite constellation and from interference sources are combined in the present arrangement to adaptively create a null that attenuates interference sources while slightly modifying the GPS received signals.

14 Claims, 15 Drawing Sheets

DIGITAL INTERFERENCE SUPPRESSION SYSTEM FOR RADIO FREQUENCY INTERFERENCE CANCELLATION

BACKGROUND OF THE INVENTION

1. Field of the Invention

The present invention relates to a digital nulling and cancellation system, preferably for Global Positioning Satellite System (GPS) receivers, Global Navigation Satellite System (GLONASS) receivers, and spread spectrum radio systems which suppresses inband interference and/or denial jamming signals in the GPS and/or GLONASS L1 and L2 frequency bands using polarization techniques. More specifically, the present invention relates to the reception of orthogonally polarized electric field vectors and to the methods for converting the analog received input signals to multi-bit digital input signals, and to the methods of attenuating interference and/or jamming signals using digital adaptive polarization techniques for mismatching of the antenna feed signal received by the receiver. The present invention suppresses interference and/or jamming by significantly reducing the interference-to-noise and/or jammer-to-signal (J/S) ratio seen by the receiver.

2. Description of Related Art

The Global Position Satellite System (GPS) [also called NAVSTAR] is a satellite navigation aiding system which transmits digitally coded data used to determine 2- and 3-dimensional position fixes at a receiving antenna. Its purpose is to provide users with high accuracy position, velocity and universal time throughout the world at low cost. For this reason, control of GPS operability in an interference environment is valuable for both military and civilian applications.

The key to achieving precise navigational performance is the processing of a very weak GPS spread spectrum signal which carries coarse acquisition (C/A) and precision (P(Y)) digitally coded and encrypted data, typically −120 dBm to −136 dBm (isotropic). The GPS signal spectrum uses two L-band frequencies, L1 at 1575.42 MHz and L2 at 1227.60 MHz, with bandwidths of either 2.05 MHz for C/A code or 20.46 MHz for P(Y) code, and employs right hand circular polarization (RHCP) for both L1 and L2 to simplify user dependence on receive antenna orientation. The C/A and P(Y) codes are on L1, the P(Y) code is on L2. Theoretical processing gains for the C/A and P(Y) codes are 43 dB and 53 dB, respectively. The critical GPS receiver reception states are: C/A code acquisition; P code direct acquisition; P code track; P code carrier aided track; and P code direct re-acquisition.

The GPS digital data can be detected and processed even if RF carrier reception is prevented by interference, but high accuracy is attained when the signal carrier is available. This is generally possible because the GPS concept has a high inherent antijam (AJ) capability, however the low receive signal level makes GPS vulnerable to low power interference and/or intentional jamming. It is relatively easy for a local inband source to overwhelm the GPS signal, preventing successful processing of the digital data. As a result the GPS system has several identified susceptibilities and vulnerabilities to interference. From both military and civilian perspectives, it is important to establish an adequate anti-jam capability for GPS systems and ensure availability of this asset in all environments. This was recognized by the military and resulted in the development of several spatial nulling antenna and digital filtering concepts.

Functionally, GLONASS is similar to GPS. Unlike GPS, where each satellite transmits a unique PRN (pseudorandum noise) code pair (C/A and P(Y)) on the same frequency in a CDMA (code division multiple access) format, each GLONASS transmits the PRN code pair at a different frequency. The process is represented as frequency division multiple access (FDMA). Therefore a GLONASS receiver tunes to a particular satellite and demonstrates some degree of inherent interference rejection using its frequency based options. A narrowband interference source that may disrupt one FDMA signal would disrupt all CDMA signals simultaneously. GLONASS also eliminates the need to consider the interference effect between multiple signal codes (cross-correlation).

GLONASS transmits signals centered on two discrete L-band carrier frequencies, L1 and L2. Each carrier frequency is modulated by a modulo-2 summation of either a 511 KHz or 5.11 MHz ranging code sequence and a 50 bps data signal. L1 can vary between 1598.063 MHz and 1608.75 MHz using 20 channels having a 0.5625 MHz spacing. L2 can vary between 1242.938 MHz and 1251.25 MHz using 20 channels having a 0.4375 MHz spacing. The frequency plan is to have satellites on opposite sides of the Earth (antipodal) share broadcast frequencies which has little effect on terrestrial users. GLONASS and GPS both use C/A and P(Y) pseudo random codes to modulate the L1 carrier, and P(Y) only to modulate the L2 carrier. The 511-bit C/A-code is clocked at 0.511 Mchips/sec. The P-code contains 33,554,432 chips clocked at a 5.11 Mchips/sec rate.

GPS and GLONASS receivers exhibit different levels of vulnerability to interference and jamming emitter waveform types, including: broadband Gaussian noise, continuous wave (CW), swept CW, pulsed CW, amplitude modulated (AM) CW, phase shift keying (PSK) pseudo noise, narrowband and wideband frequency modulated signals, etc. Vulnerability is highly scenario and receiver mode dependent. Broadband Gaussian noise is the most critical interference type in the above group because of the difficulty in filtering broadband noise without concurrent GPS or GLONASS quieting, and the intrinsic high cost and performance impact associated with spatial filtering, i.e. null steering, solutions on a moving platform.

A system has been developed for suppressing interference and/or denial jamming signals in the GPS L1 and L2 frequency bands, described in copending U.S. patent application Ser. No. 08/608,493 filed Feb. 28, 1996 now U.S. Pat. No. 5,712,641, entitled Interference Cancellation System for Global Positioning Satellite Receivers, inventors being Casabona, Rosen, and Silverman and assigned to the same assignee as the present application (hereinafter the "Casabona I application") and described in copending U.S. patent application Ser. No. 08/713,891 filed Sep. 17, 1996, now U.S. Pat. No. 5,822,429 entitled System for Preventing Global Positioning Satellite Signal Reception to Unauthorized Personnel, inventors being Casabona and Rosen and also assigned to the same assignee as the present application (hereinafter the "Casabona II application"). Such system employs polarization nulling utilizing electric field vector cancellation to effect inband interference suppression for GPS and GLONASS systems. Polarization cancellation has also been known to eliminate interference signals in data links and for communications channels, and for robust radar electronic countermeasures and electronic counter-counter measures. See, U.S. Pat. Nos. 3,883,872; 4,283,795; 4,937,582; 5,298,908; and 5,311,192. The general implementation of polarization in GPS systems, as described in the Casabona I and II applications, uses a dual polarization antenna, a hardware polarimeter network and a control loop to cross-polarize the antenna network to interference of the composite signals. The general implementation of polarization nulling in communications utilizes a tracking channel to track the interference signal in phase and amplitude and reintroduce this signal in a canceling circuit to cancel interference components of the composite received signal. RF polarimeters have also been utilized in instrumentation radars to realize antenna matching, optimize performance, and for target measurement. Reciprocal RF polarimeter devices are utilized for radar jamming to realize cross-polarization countermeasures. Polarization nulling as used in the Casabona I and II applications for GPS interference suppression applications utilize a hardware implementation of the polarimeter structure composed of separate phase shifters and hybrid junction devices to suppress wideband and narrowband interference.

Digital adaptive transversal filter nulling for spread spectrum receivers as an approach to cancel narrowband interferences is known in the prior art. See, U.S. Pat. No. 5,268,927. The generalized implementation digitizes analog input signals, which comprise multiple spread-spectrum signals, thermal noise and additive multiple interferers, and applies a digital finite impulse response (FIR) filter response to the multi-bit digital representation of the input signals, and uses a set of variable digital weight coefficients to generate digital output signals which contain a reduced amount of narrowband interference. A significant problem is that adaptive transversal filtering is not effective in processing wideband interference or jamming without disruption of the underlying GPS signals. Adaptive transversal filtering is very effective against continuous-wave (CW) interference and narrowband interferences, such as pulsed CW and swept CW. Polarization nulling, in comparison, is effective against all forms of interference, especially wideband noise interference.

It is thus desirable to provide a digital signal processing interference canceling system for GPS systems that can deal with complex narrowband and wideband interference environments composed of diverse interference and/or jamming waveform types, L1 and/or L2 band interferences, multiple interference sources, and different interference polarizations. It is further desired that the interference canceling system provide high levels of cancellation for either or both of the GPS operating frequencies and adapt to variation in orientation of the receiver antenna(s) and/or the interference source. It is desirable that the polarization interference canceler process digitally encode representations of the received signals and implement the polarization signal cancellation phenomena on these signals, preserving the information content of the GPS signals.

SUMMARY OF THE INVENTION

The present invention addresses wideband frequency performance of digital polarimeter implementations operating at high sampling rates and under strong wideband and narrowband interference conditions, particularly for spread spectrum applications, and specifically GPS and GLONASS. The digital approach attempts to overcome some of the disadvantages of prior art by utilizing emerging solid-state numeric processing technology to fabricate an ideal implementation of the polarimeter. Digital implementation of the polarimeter is highly desirable for reducing size, power, cost and to achieve idealized frequency and linear device performance. High sampling rate requirements are due to the spread spectrum processing, since the signal bandwidth for GPS requires the higher chip rate, specifically the P(Y)-code chip rate (e.g., 10.23 MHz) of GPS. (The analogous signal bandwidth for GLONASS requires processing of the maximum FDMA band of ±5.34 MHz and 5.11 Mchips/sec rate.) Moreover, strong interference conditions result from the normal reception of the desired signal at very weak power levels. The invention addresses high interference-to-noise and jammer-to-signal ratio requirements.

Further, the invention provides innovative solutions to the following technical issues related to digital polarimeter implementation:

(a) Analog-to-digital interface issues, wherein the invention produces sufficient input signal power regulation to ensure that the derived signals at the polarimeter input do not suffer nonlinear distortion due to clipping or low input resolution.

(b) Digital signal phase resolution issues, wherein the invention optimizes the effective resolution of the various digital signals internal to the numeric, or digital, polarimeter.

(c) Insertion phase and insertion loss flatness issues over frequency, and channelization performance issues of the integrated polarimeter, wherein the invention optimizes or equalizes the effective polarization response of the device across the baseband, and does not experience phase and loss distortion due to non-ideal components as in a discrete implementation.

(d) Cyclic phase shift wrapping issues of the polarimeter $\gamma/\phi$ modulations, wherein the invention uses a binary angle code scheme with the inherent $\pi$ and $2\pi$ cycle boundary wrapping performance of a numeric rather than hardware phase shifter.

(e) Phase shift linearity and AM/PM (amplitude modulation resulting from phase modulation) issues of the polarimeter $\gamma/\phi$ modulations, wherein the invention uses an ideal numeric rather than hardware phase shifter implementation for ideal linearity and monotonicity, and with no AM/PM dependencies.

Item (a) above refers mainly to the need for obtaining the highest gains practical for the input signals and for control of the multiple signals. Item (b) above refers to the need to control the phase resolution of the numeric modulation to obtain the speed of null convergence and the greatest null practical. Item (c) above refers to the need to maintain good phase flatness and balance of the polarimeter across the band. Item (d) above refers to the routine need to seamlessly process $\gamma/\phi$ modulations across the $\pi/2\pi$ boundary limits common to polarimeter implementation. Item (e) above refers to the need to bracket and develop local and global polarization (minima and/or maxima) in an efficient manner using linear programming techniques (i.e., linear functions of independent variables).

It is thus a principal object of the present invention to provide a digital implementation of an interference nulling system for GPS and GLONASS which exploits the differences in apparent polarization of the right hand circular polarization satellite signals and polarization of interference sources, and to suppress inband interference and to suppress jamming signals in the L1 and L2 frequency bands.

It is a further object of the present invention to convert the signals from an antenna system that processes the orthogonal elements or components of the interference signal(s) and of the GPS signals to a baseband, encode and generate multi-bit input signals, and to adaptively cross-polarize the antenna system and null the interference signals to the GPS receiver.

It is a further object of the present invention to provide a simplified digital or numeric construction of a polarimeter for direct sequence spread spectrum receivers.

It is a further object of the present invention to provide a digital or numeric polarimeter operating at sampling rates commensurate with GPS and GLONASS spread spectrum code rates 10 MHz.

It is a further object of the present invention to provide a digital polarimeter operating at interference-to-noise ratios exceeding 50 dB.

It is a further object of the present invention to receive the interference signals using digital adaptive transversal filters in serial arrangements and to sample the interference signal so as to numerically process the combined interference signals and GPS signals and to null out narrowband interference signal(s) in the multi-bit output data or signal to the GPS receiver.

It is still a further object of the present invention to provide a numeric polarimeter and with provisions for integration with a digital adaptive transversal filter and having improved signal resolution for increased interference suppression.

It is another general object of the present invention to detect the interference signals and control the digital adaptive cross-polarization nulling and digital adaptive transversal filter system without the need to process the underlying spread spectrum signals.

It is another general object of the present invention to utilize a modular implementation which addresses requirements to independently process interference in L1 only, L2 only, and L1 and L2.

It is another general object of the present invention to present an installed insertion loss/gain and processing gain to the GPS receiver that improves GPS receiver performance.

These and other objects of the invention are embodied in the digital polarimeter having an analog-to-digital interface for regulating the power of down converted orthogonal analog baseband signals and converting them to digital multi-bit baseband signals of variable resolution. The baseband signals contain multiple spread spectrum signals, thermal noise, and interference. The resolution of the digital baseband signal increases as the power of the interference increases.

A digital finite response filter may optionally be used to complement performance, firstly to establish the processing bandwidth of the channel, and secondly to suppress narrowband interferences in the band in accordance with known adaptive filter techniques. The generation and update of the filter weights and coefficients is known in the art. See, for example, the text "Adaptive Signal Processing", Widrow and Stearns, Prentice-Hall, 1985. See, also, U.S. Pat. No. 5,268,927. The digital baseband signals may be filtered either as the inputs to the numeric polarimeter signal processing (i.e., on the two orthogonal antenna input signals), or following digital polarimeter processing (i.e., on the output signals). The realization of the filtering process is dependent on the precise implementation of the invention with regard to signal dynamic range and resolution. The later post polarimeter filtering approach may be more easily realized to suppress multiple narrowband interference sources, and to reveal for detection the residual interference environment which may be composed of wideband noise or frequency agile interference sources. The action of digital polarimeter suppression on the residual environment may change the performance of the filters.

The suppression of narrowband interference increases as the power of the received interference increases, and as its spectral and polarization concentration decreases. The suppression of wideband interference increases as the power of the received interference increases, and as its polarization concentration decreases.

According to these and other objects of the present invention, there is provided an interface to an orthogonal polarization receive antenna system of the types as described in the Casabona I and II application that decomposes the received L-band environment into the apparent orthogonal polarization signals representative of the GPS or GLONASS signal and inband interference sources. The orthogonal components of the received environment are filtered, amplified and transmitted from the antenna system to the nulling system in each GPS band using separate transmission lines or media. The input signals are converted to a baseband and analog-to-digital converted to multi-bit input signals. The digital signals in each band of the GPS channel are detected and processed to identify interference conditions and to control variables in the processing algorithms applied to the derivatives of the antenna signals in each band of interest that control the effective polarization (and bandwidth) of the combined antenna system. The effective polarization property of the antenna system and numeric processing network are controlled so as to cross-polarize or mismatch the antenna to the interference source and thus null or suppress the interference signal in the output containing the GPS signals. In configurations where L1 and L2 bands are processed separately, such as described in the Casabona I and II applications, they are recombined after independently nulling, and provided to the GPS receiver. Detection, control and digital/numeric modulation are optimized to identify, acquire and modulate the cross-polarization properties of the adaptive network to a null. Under a no interference condition, the adaptive loops are configured for a preferred polarization property for optimum receipt of the GPS signals.

DESCRIPTION OF THE PREFERRED EMBODIMENTS

Figure 1:
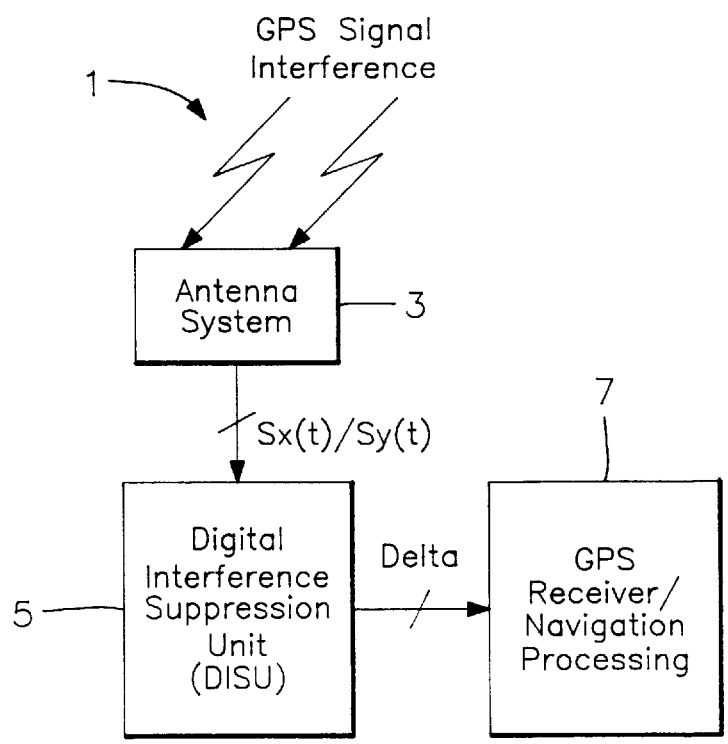
FIG. 1 is a top-level block diagram showing the digital adaptive cross-polarization interference cancellation system for a spread spectrum receiver, such as GPS, in accordance with a preferred embodiment of the invention.

A top-level block diagram showing the digital adaptive cross-polarization interference suppression system for spread spectrum and GPS signals is depicted in FIG. 1. The diagram illustrates one channel or band, such as the L1 or L2 band, of the invention showing the cancellation concept and illustrating the received signal 1 composed of the GPS signals and the interference and/or jamming signal. The received signals 1, consisting of the combined GPS signals and the interference signals, are converted by the antenna system 3 into orthogonal components in a manner as, for example, described in the Casabona I and II applications, incorporated by reference herein, and then furnished to the digital interference suppression unit 5. The delta output port of the unit 5 provides the signal to the GPS receiver 7. This output may be provided in a digital multi-bit interface, or as an analog interface, as will be described. The invention detects interference and cross-polarizes the feed to null the interference to the GPS receiver. The antenna system 3 is a dual polarized antenna configuration, preferably cross-polarized antenna feed. One type of antenna system 3 is the dual patch antenna configuration as depicted and described in FIGS. 5–7 of the Casabona I application, incorporated by reference.

Figure 2:
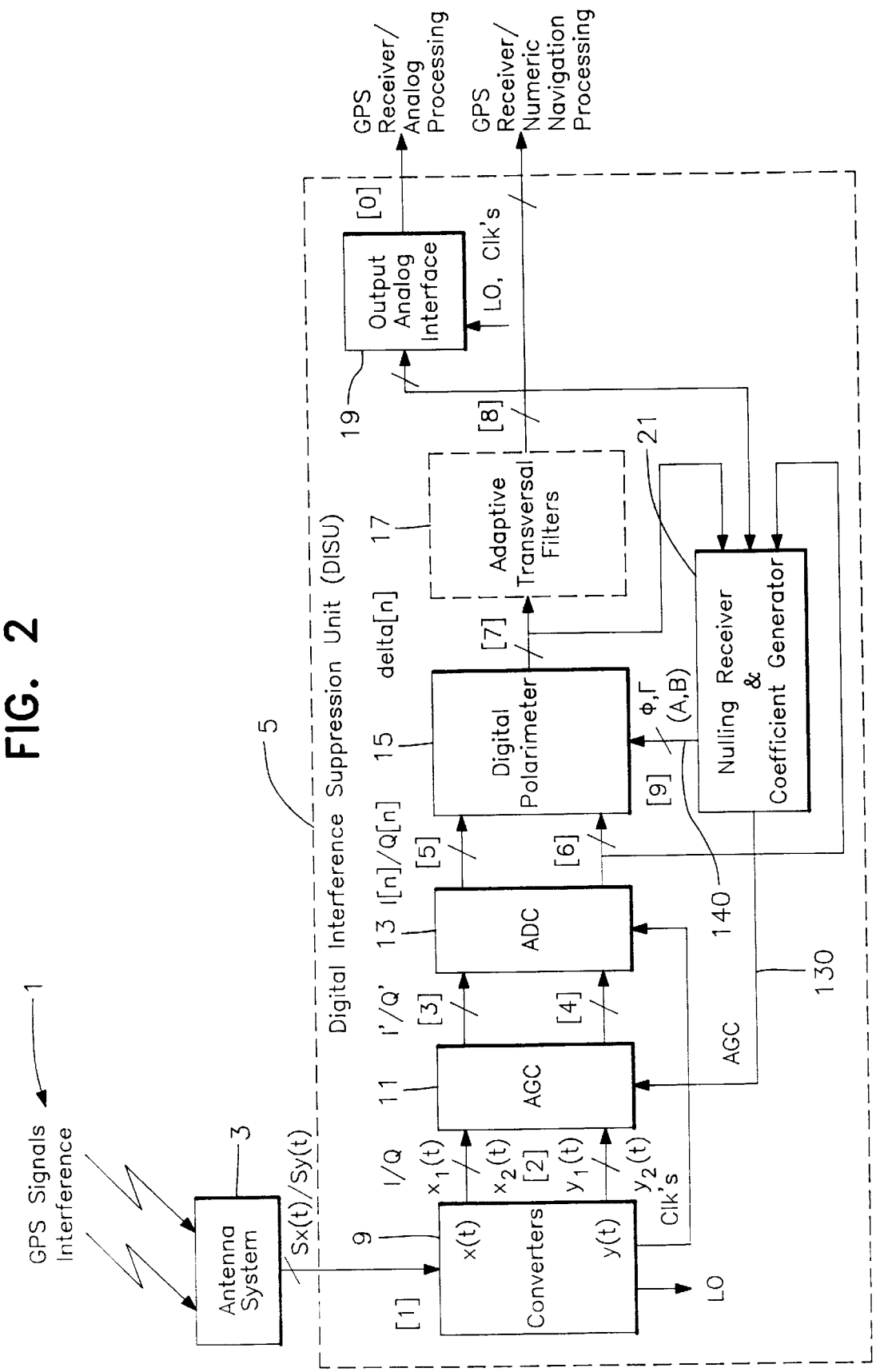
FIG. 2 is a block diagram showing the architecture of the digital interference suppression unit (DISU) of the invention in FIG. 1.

FIG. 2 shows one preferred embodiment of a single channel (such as L1 and L2 channel) dual orthogonal antenna configuration for numerically nulling interference. Illustrated in the figure is the digital interference suppression architecture 5 composed of a numeric or digital polarimeter 15 (sometimes referred to as a gamma/phi modulator) and a supplemental or optional adaptive transversal filter 17 (shown dotted). The operation of the numeric polarimeter emulates the functionality of the analog polarimeter described in the Casabona I and II applications. The analog input circuit to the invention is composed of a converter 9 and automatic gain control (AGC) 11. The dual orthogonal analog input signals [1] are converted to a baseband [2] using quadrature IF mixers (QIFM's), as will be described, for further processing and signal gain control by the AGC 11 in a coordinated (ganged) manner to compensate for power excursions in said analog input signals, and for generating power-regulated maximum analog signals which are linearly related to the received signals. The in-phase, I, and quadrature-phase, Q, signals for each of the dual input analog signals are provided as output signals [3&4] to analog-to-digital converters 13 for converting the power-regulated analog signals to multi-bit digital input signals [5&6]. These digital, i.e., numeric, signals are provided to a digital polarimeter arrangement 15, responding to the digital input signals using a set of phase modulation coefficients for numerically generating digital output signals equivalent to the delta (and sigma) port outputs as described in Casabona I and II. The intermediate numeric signals [7] can optionally be provided to a supplemental digital finite impulse response (FIR) filter and coefficient/weight generator 17, responding to the signals using a set of variable digital coefficients for numerically generating a digital output [8] containing a reduced amount of narrowband interference. The numeric signals are provided to a detection nulling receiver and phase modulation coefficient generator 21 responding to the digital inputs [5&6] and digital output signals [7&8] for programming and updating polarimeter phase modulation coefficients [9], and for combining input signals for cancellation of the interference signals for producing at the output [8] a signal with suppressed interference levels. The output is provided to the spread spectrum or GPS receiver in numeric format [8] for navigation processing, or the numeric output signals are converted by an analog signal interface 19 [0] to the spread spectrum or GPS receiver 7.

Figure 3:
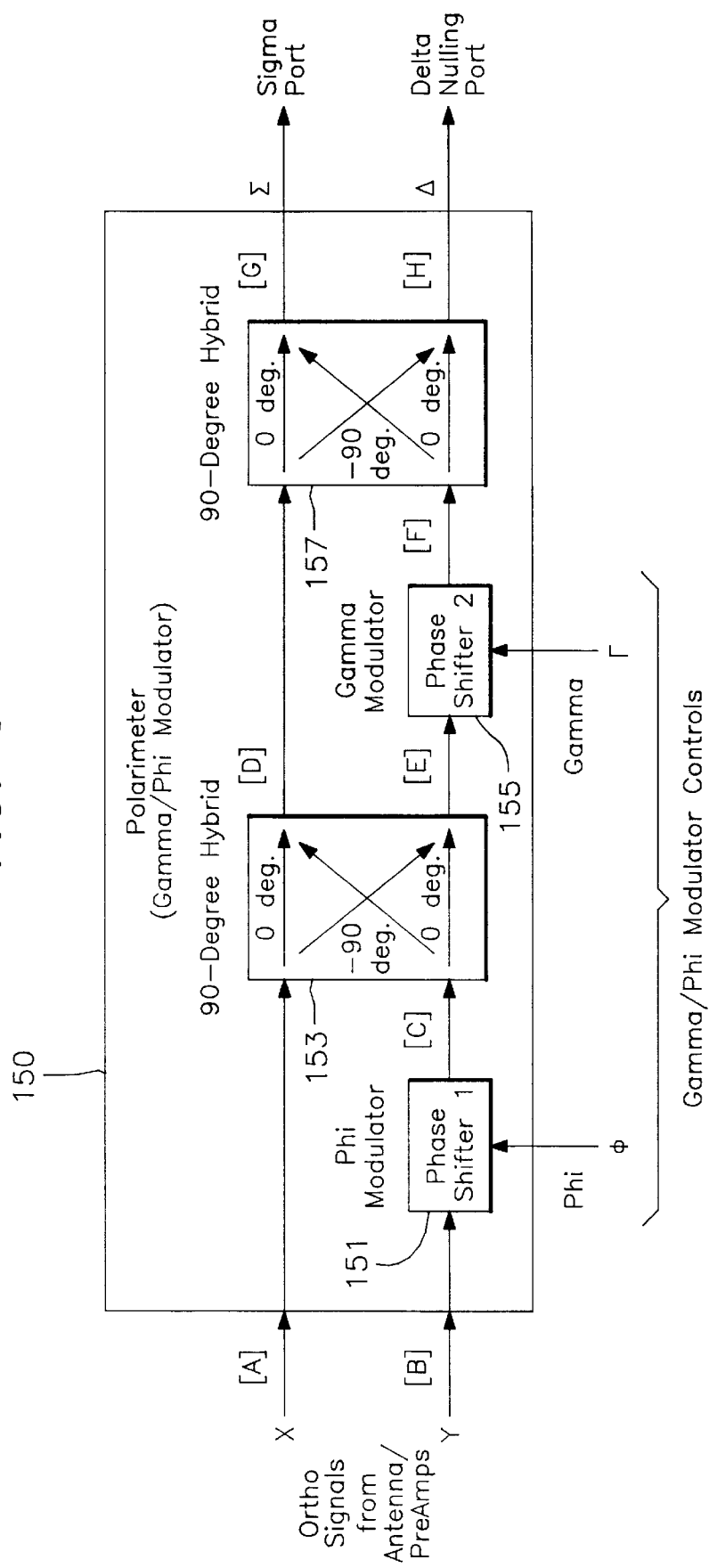
FIG. 3 is a block diagram of the hardware implementation of an ideal polarimeter embodiment of the type as described in the Casabona I and II applications.

For purposes of explaining the operation of the present invention for numerically nulling a signal, it is assumed that all received signals, GPS signals and interference signals, are composed of orthogonally polarized waves. The central feature of the proposed digital interference suppression system is the numeric polarimeter 15 using a signal space processing approach. Refer now to FIG. 3 showing a block diagram of one preferred hardware embodiment of a general polarimeter arrangement 150 for a dual ortho antenna configuration used for nulling of interference as described in the Casabona I and II applications. The polarimeter architecture 150 (sometimes referred to as a gamma/phi modulator) receives an input [A&B] of unequal phase and amplitude ortho signals which are first adjusted by phase shifter 151 for phase to relative quadrature and then provided to the first hybrid junction 153. The output signals of the first hybrid 153 are theoretically equal in amplitude. The outputs of the first hybrid [D&E] are then adjusted in relative phase [D&F], via phase shifter 155 and combined in the second hybrid 157 to produce a minimum null at one output port [H], termed the delta or difference port, that is effectively the null of the interference signal. The second output of the hybrid [G] concurrently produces a maximum output, termed the sigma or summing port. A simple ideal phase shifter arrangement is shown in each leg of the gamma, $\Gamma$, and phi, $\Phi$, modulation process to provide ideal operation over frequency and power. The delta outputs of the second hybrid junction are detected in the interference suppression procedure and used to adaptively generate control signals for gamma/phi modulations. The generation of the control signals are described in the Casabona I and II applications. The controls manage the system to null interference signals at the delta port [H], compensate for installation variations and apparent interference signal changes, and for component unbalance. The null output of the second hybrid [H] is also provided to the spread spectrum or GPS receiver as an input with the interference signal suppressed. Hardware embodiments of a polarimeter, however use real components and is performance sensitive to non-ideal frequency and linearity effects. A numeric representation of the polarimeter using digital input signals can reproduce the null performance of the device with ideal operation.

The mathematical relationships of the polarimeter will now be discussed, with reference to the various drawings. The input GPS signals and interference/jamming signals are received by the antenna system 3 and decomposed into two orthogonal polarization components, $s_x(t)$ and $s_y(t)$, by the dual-polarized antenna system, as is known from the Casabona I and II applications. Although it is commonly the case to select either vertical/horizontal linear polarization or right-hand/left-hand circular polarization pairing, the requirement is simply that the two elements be mutually orthogonal in polarization, i.e. any two points, or polarizations, on the Poincaré Sphere which are diametrically opposed will suffice.

Given a real-valued signal $s_x(t)$ with frequency content concentrated in a narrow band region about a frequency $f_0$, we may write $$s_x(t)+js_x'(t)=s_{x1}(t)exp(j\omega_0 t) \quad (1)$$

where $$s_{x1}(t)=x_1(t)+jx_2(t) \quad (2)$$

represents the complex envelope, $s_x(t)+js_x'(t)$ is the analytic signal, and $s_x'(t)$ is the Hilbert transform of $s_x(t)$. We note that the complex envelope may be regarded as the equivalent lowpass signal. Substituting equation (2) into equation (1) and equating real and imaginary parts, we obtain $$s_x(t)=x_1(t) \cos(\omega_0 t)-x_2(t) \sin(\omega_0 t)$$

and $$s_x'(t)=x_1(t) \sin(\omega_0 t)+x_2(t) \cos(\omega_0 t).$$

This is called Rice's representation. Likewise, the bandpass signal present at the y-channel antenna terminal has real and imaginary parts $$s_y(t)=y_1(t) \cos(\omega_0 t)-y_2(t) \sin(\omega_0 t)$$

and $$s_y'(t)=y_1(t) \sin(\omega_0 t)+y_2(t) \cos(\omega_0 t).$$

Figure 4:
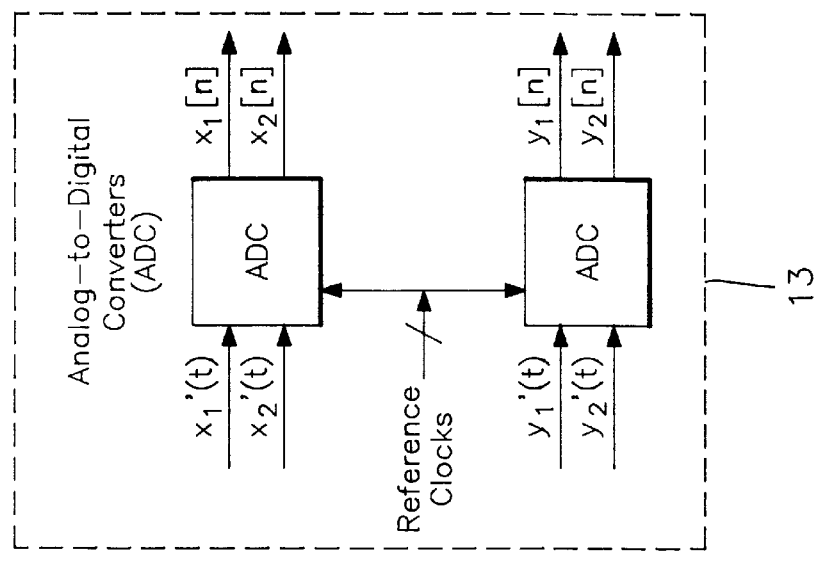
FIG. 4 is a block diagram of the converter for the invention in FIG. 2.

As written, we may interpret the functions $\cos(\omega_0 t)$ and $\sin(\omega_0 t)$ as a "basis" for a signal space representation; the functions are orthogonal and span the space. The x-channel quadrature components [A], $x_1(t)$ and $x_2(t)$, together with their y-channel counterparts [B], $y_1(t)$ and $y_2(t)$, are shown in FIG. 4 (or point [2] of FIG. 2) after quadrature demodulation by the converter 9 (at the QIFM outputs). Although the implication of FIG. 4 is that the translation is to baseband, this is really a mathematical convenience. By reducing the bandpass signals to equivalent lowpass signals, we do not incur a loss of generality. Hence, the actual downconversion scheme could be to a non-zero IF and the results derived below hold.

After downconversion, the quadrature components are filtered and sampled (via AGC 11 and ADC 13). The discrete-time quantity outputs of FIG. 6 (points [5] and [6] of FIG. 2) are processed by the digital polarimeter algorithm written as column vectors $$x = \begin{bmatrix} x_1[n] \\ x_2[n] \end{bmatrix} = \begin{bmatrix} x_1 \\ x_2 \end{bmatrix}$$

$$y = \begin{bmatrix} y_1[n] \\ y_2[n] \end{bmatrix} = \begin{bmatrix} y_1 \\ y_2 \end{bmatrix}$$

for processing by the numeric polarimeter 15. That is, the digitally converted output of the ADC converter 13 of FIG. 6 may be represented by the above column vectors for processing by the digital polarimeter algorithm, to be described. To describe the algorithm we will refer to the discrete implementation of the general polarimeter device in FIG. 3. The building blocks for discrete-time implementation are the orthogonal transformation matrix, Q, and the adder.

The orthogonal transformation matrix, for the $\Phi$-phase shifter 151 may be written:

$$\Phi = \begin{bmatrix} \cos\phi & -\sin\phi \\ \sin\phi & \cos\phi \end{bmatrix}$$

and the $\Gamma$-phase shifter 155 may be written:

$$\Gamma = \begin{bmatrix} \cos\gamma & -\sin\gamma \\ \sin\gamma & \cos\gamma \end{bmatrix}$$

where $\phi$ and $\gamma$ are the desired phase shift values for numeric modulator control. To complete the discrete-time version of the 3 dB quadrature hybrid 153,157, we develop a 90° phase shift, or in orthogonal transformation matrix form:

$$Q = \begin{bmatrix} 0 & -1 \\ 1 & 0 \end{bmatrix}$$

If we take the data vectors through the network shown in FIG. 3 and apply the appropriate operators we obtain the following signals:

point [C] $\Phi y$
point [D] $x+Q\Phi y$
point [E] $Qx+\Phi y$
point [F] $\Gamma Qx+\Phi y$
point [G] $\Sigma=x+Q\Phi y+Q\Gamma Qx+Q\Gamma\Phi y$
point [H] $\Delta=\Gamma Qx+\Gamma\Phi y+Qx+QQ\Phi y$ since $$QQ=-I$$

then $$QQ\Phi=-\Phi, \text{ and } QQ\Gamma=-\Gamma$$

$\Sigma$ becomes $$\Sigma=(I-\Gamma)x+(Q\Phi\Gamma+Q\Phi)y$$

and $\Delta$ becomes $$\Delta=(\Sigma Q+Q)x+(\Sigma\Phi-\Phi)y$$

Note that the factor of ½ has been omitted. The output of complex multiplies are shifted left by one bit internally. For this reason, both the real and imaginary outputs have the same magnitude as the input.

Finally, by taking the data vectors through the above network and applying the appropriate operators we obtain the digital polarimeter algorithm in matrix form $$\Gamma=(\Gamma Q+Q)x+(\Gamma\Phi-\Phi)y \quad (3)$$

and $$\Sigma=(I-\Gamma)x+(Q\Gamma\Phi+Q\Phi)y \quad (4)$$

Further simplifying and reordering the $\Delta$ process in (3) results in $$\Delta = (\Gamma+I)Qx + (\Gamma-I)\Phi y$$

where we define $$A = (\Gamma+I)Q$$

$$B = (\Gamma-I)\Phi$$

and $$66 = Ax + By$$

Further simplifying and reordering the $\Sigma$ process in (4) results in $$\Sigma = (I-\Gamma)x + (\Gamma+I)Q\Phi y$$

where we define $$C = (I-\Gamma)$$

$$D = (\Gamma+I)Q\Phi = A\Phi$$

and $$\Sigma = Cx + Dy$$

For application of the $\Delta$ algorithm in the numeric process, the matrix operators (A and B) can be calculated off-line. Since the A and B matrices are 2×2, and the x and y vectors are each 1×2, the algorithm requires 8 multiplies and 6 adds per sampled data point. (Only the $\Delta$-port numeric process is necessary for numeric polarimeter interference suppression operation.) The $\Delta$ matrix process is implemented as follows:

$$\Delta = \begin{bmatrix} \delta_1 \\ \delta_2 \end{bmatrix} = \begin{bmatrix} a_{11} & a_{12} \\ a_{21} & a_{22} \end{bmatrix} \begin{bmatrix} x_1 \\ x_2 \end{bmatrix} + \begin{bmatrix} b_{11} & b_{12} \\ b_{21} & b_{22} \end{bmatrix} \begin{bmatrix} y_1 \\ y_2 \end{bmatrix}$$

where A and B matrix coefficients are, $a_{11} = -\sin \gamma$ $a_{12} = -\cos \gamma - 1$ $a_{21} = \cos \gamma + 1$ $a_{22} = -\sin \gamma$ $b_{11} = \cos \gamma \cos \phi\phi - \sin \gamma \sin \phi - \cos \phi$ $b_{12} = -\cos \gamma \sin \phi\phi - \sin \gamma \cos \phi + \sin \phi$ $b_{21} = \sin \gamma \cos \phi\phi + \cos \gamma \sin \phi - \sin \phi$ $b_{22} = -\sin \gamma \sin \phi\phi + \cos \gamma \cos \phi - \cos \phi$ The $\Delta$-port discrete-time output signal moves to the next processing block which can be the GPS navigation processing or an adaptive transversal filter.

For application of the $\Sigma$ algorithm in the numeric process, the matrix operators (C and D) can also be calculated off-line as above. The C and D matrices are 2×2, and the x and y vectors are each 1×2, the algorithm also requires 8 multiplies and 6 adds per sampled data point. The $\Sigma$ matrix process is implemented as follows $$\Sigma = \begin{bmatrix} \sigma_1 \\ \sigma_2 \end{bmatrix} = \begin{bmatrix} c_{11} & c_{12} \\ c_{21} & c_{22} \end{bmatrix} \begin{bmatrix} x_1 \\ x_2 \end{bmatrix} + \begin{bmatrix} d_{11} & d_{12} \\ d_{21} & d_{22} \end{bmatrix} \begin{bmatrix} y_1 \\ y_2 \end{bmatrix}$$

where C and D matrix coefficients are $c_{11} = -\cos \gamma + 1$ $c_{12} = +\sin \gamma$ $c_{21} = -\sin \gamma$ $c_{22} = -\cos \gamma + 1$ $d_{11} = -\cos \gamma \sin \phi\phi - \sin \gamma \cos \phi - \sin \phi$ $d_{12} = -\cos \gamma \cos \phi\phi + \sin \gamma \sin \phi - \cos \phi$ $d_{21} = -\sin \gamma \sin \phi\phi + \cos \gamma \cos \phi + \cos \phi$ $d_{22} = -\sin \gamma \cos \phi\phi - \cos \gamma \sin \phi - \sin \phi$ Referring now to the preferred embodiment of the invention as shown in FIG. 2, the digital interference suppression unit 5 comprises three digital sections, one, a numeric or digital polarimeter 15, second a supplemental adaptive transversal filter 17 (shown dotted), and, third, a nulling receiver and digital phase coefficient generator 21, as well as an analog interface comprised of a conversion section 9, an automatic gain control (AGC) section 11 and an analog-to-digital conversion (ADC) section 13, and an output analog interface section 19. The numeric polarimeter 15 is driven by the digital baseband signals x and y [5&6]. The delta output [7] of the digital polarimeter 15 can be subsequently provided to a supplemental adaptive transversal filter 17. The digital polarimeter 15 receives a set of phase coefficients A and B [9] computed for $\gamma$ and $\phi$. The performance of the digital polarimeter 15 and adaptive transverse filter 17 depend on the numeric resolution of the digital input signals. The analog input interface receives quadrature unregulated signals [2] from the downconverter 9 for x- and y-channels [1] and provides digital regulated signals [5&6] of variable resolution to the digital polarimeter 15. The analog interface, digital polarimeter, digital filter and phase coefficient generator are driven by a common clock rate. At the high sampling rate for GPS P(Y)-code applications, the digital polarimeter and filter can be implemented with discrete integrated circuits. At the lower sampling rate for GPS C/A-code application, implementation is feasible using digital signal processor (DSP) circuits. The quadrature delta output of the digital polarimeter [7] or the quadrature output of the adaptive transversal filter [8] is provided as either a numeric output to numeric navigation processing, or provided as an analog output [0] to a navigation receiver by the output analog interface 19.

Refer now to FIG. 4 showing the detail of the converter 9 used in the digital interference suppression unit. The converter 9 is the first part of the analog interface for the invention. The converter is comprised of a sin/cos local oscillator (LO) frequency developed by a fixed LO 90, or a frequency synthesizer or a numerically controlled oscillator (NCO). The local oscillator signal is used in conjunction with two quadrature IF mixers (QIFM) 91, 93 to downconvert the L1 or L2 orthogonal analog input signals Sx(t), Sy(t), the x-channel and y-channel, from the antenna system 3 to a baseband or near-baseband, which have been preamplified by some fixed gain in previous sections. (The term "baseband" as used herein and in the claims means a baseband or near-baseband.) The signal of interest is now at baseband so that low pass filtering can be used to eliminate unwanted signals. Since the spectrum of the signal of interest is sufficiently narrow, the sample rate of the signals can be matched to meet the throughput requirements of the downstream processing. The conversion process produces a pair of quadrature I/Q components for each of the two channels, $x_1(t)$ and $x_2(t)$, and $y_1(t)$ and $y_2(t)$, respectively. The quadrature signals, $x_1(t)$, $x_2(t)$, $y_1(t)$ and $y_2(t)$, are provided to the automatic gain control section 11 of the analog interface. The LO 90 provides a sample of the local oscillator signal to the upconversion function when the unit is configured to provide an analog output interface to a receiver. The LO 90 provides the high speed encoding clock signals for the input analog-to-digital conversion portion of the analog interface. Alternate embodiments can use direct signal decimation.

Figure 5:
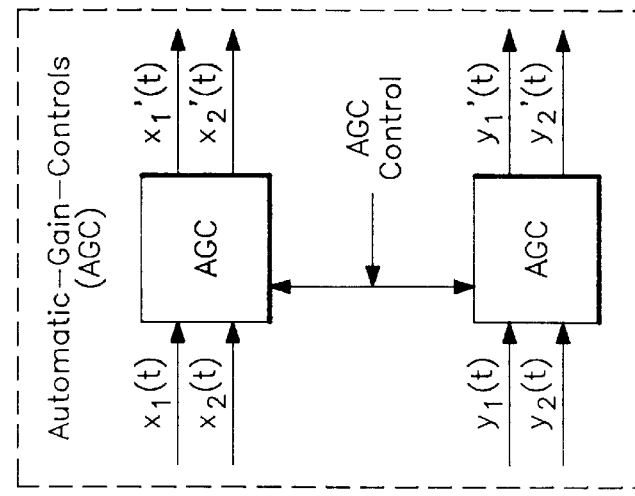
FIG. 5 is a block diagram of the automatic-gain-control (AGC) for the invention in FIG. 2.

Refer now to FIG. 5 showing the detail of the automatic gain control portion 11 of the analog interface of the invention. The AGC circuit 11 provides power-regulated quadrature analog signals, $x_1'(t)$, $x_2'(t)$, $y_1'(t)$ and $y_2'(t)$, to the analog-to-digital converters 13, so that the maximum signals do not exceed the amplitude limit of the ADC 13 when the interference is at its highest level, so that the signals can be digitized with adequate resolution for digital polarimeter operation.

Figure 6:
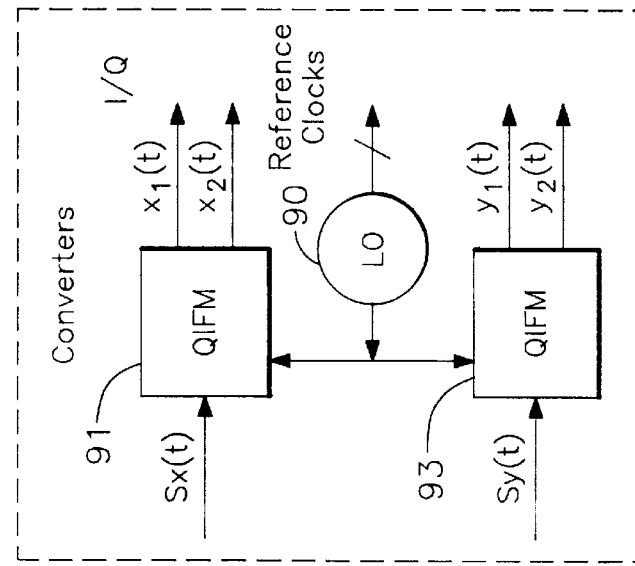
FIG. 6 is a block diagram of the analog-to-digital converter (ADC) for the invention in FIG. 2.

Refer now to FIG. 6 showing the detail of the analog-to-digital converter circuits 13 which sample the signals, $x_1'(t)$, $x_2'(t)$, $y_1'(t)$ and $y_2'(t)$, at a selected rate, which typically equals, or is higher than the underlying spread spectrum chip rate, and provides digital signals, $x_1[n]$, $x_2[n]$, $y_1[n]$ and $y_2[n]$, to the numeric polarimeter 15. The analog interface must preamplify the input signals with minimum nonlinear distortion over the whole IF output power range. Therefore strong interference signals require less gain, and weaker interference signals more gain. Partially regulated output signals can be provided when the strength of the interference and the maximum highest gain correspond to the maximum range of the ADC minus a back-off factor familiar to the art. Partial regulation is adequate for the digital polarimeter because input resolution requirements decrease as the interference-to-noise or jammer-to-signal ratio decrease. Each bit of loss in ADC resolution corresponds to a 6 dB decrease in power, and can exercise control over only a segment of the power range. The gain control of the quadrature inputs for the x-channel and y-channel are ganged or coordinated so that the largest signals in I or Q set the AGC level for the respective channel. The x-channel and y-channel are not ganged to each other.

For GPS operation, a system resolution of 8-bits appears adequate for 20 dB interference suppression, 10-bits for 32 dB suppression, 12-bits for 44 dB suppression, 14-bits for 56 dB suppression, and 16-bits for 68 dB suppression.

Figure 7:
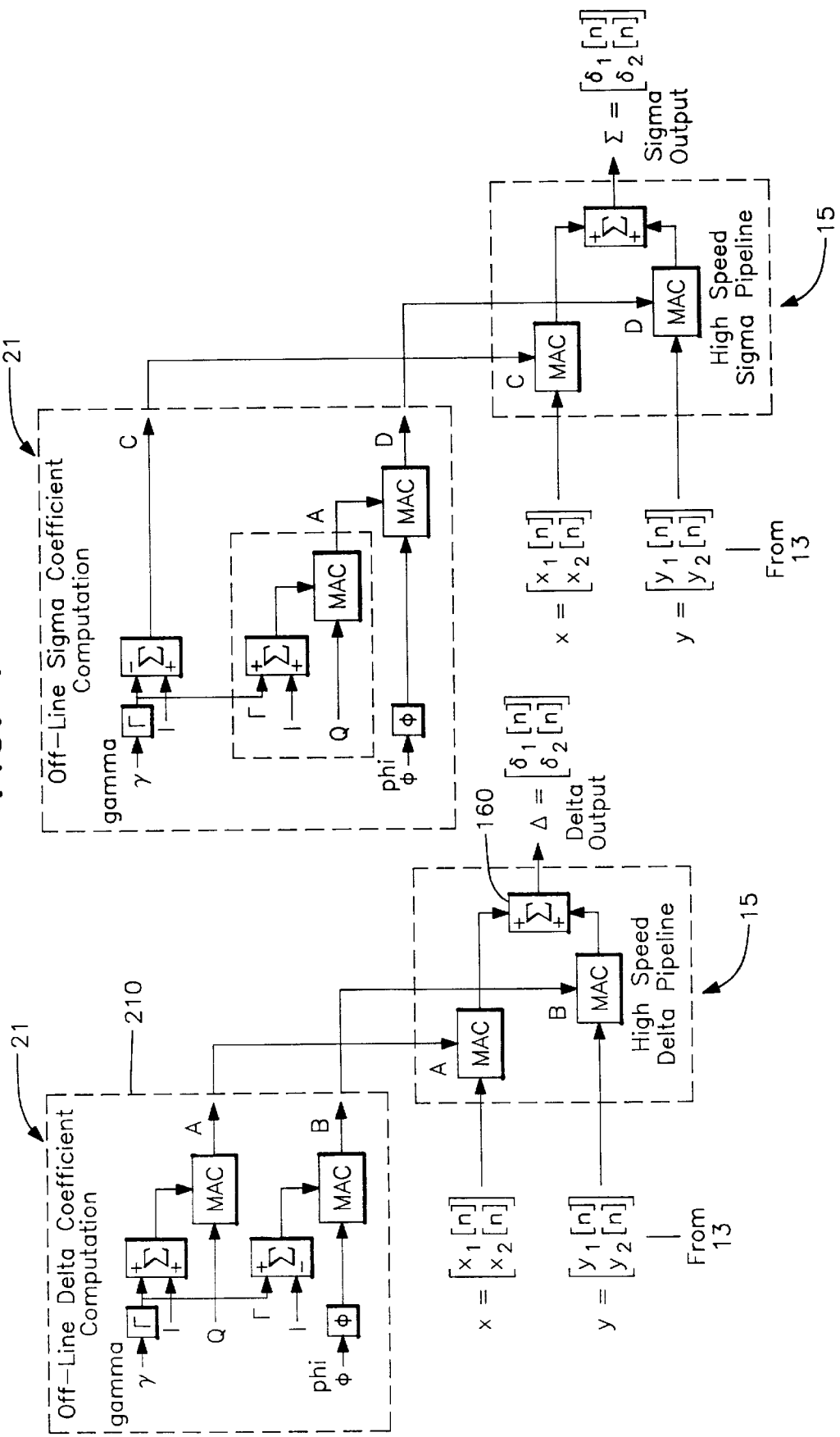
FIG. 7 illustrates a preferred embodiment of the digital polarimeter using numeric signal processing techniques for the invention in FIG. 2.

An embodiment of the digital polarimeter 15 is shown in FIG. 7. Digital baseband input signals x and y from the ADC 13 are provided to the polarimeter 15 at the encoder sampling rate. For purposes of nulling an interference signal, only the delta modulation channel and output are necessary. The sigma modulation channel and output are shown for completeness of the polarimeter implementation and is used in denial applications. For the delta implementation shown, phase coefficients A and B, are set by the off-line delta coefficient generator 210 within the nulling receiver and coefficient generator 21, and are selected for null convergence by the control algorithm. For each input sample, the digital polarimeter multiplies the x input samples by the A matrix and the y input samples by the B matrix, and are digitally combined at the adder 160 to form the delta output result in quadrature format. The high speed delta procedure consists of 8 multiplies and 6 adds per sampled data point, as noted earlier, and is shown as a high speed pipeline process effectively operating at the encode rate. The delta output may be provided to a supplementary series finite impulse response filter 17 or directly to a numeric output interface to the GPS receiver 7 or directly to an analog output interface 19.

The delta phase coefficient generator 210 is shown in FIG. 7 as an off-line operation, signifying that the A and B matrix coefficients are generated as part of the control function within nulling receiver and coefficient generator 21, and not necessarily the high speed pipeline, i.e., the polarimeter 15. Alternate embodiments can generate the A and B coefficients from numeric $\gamma/\phi$ inputs using firmware, hardware or software means. The coefficient generator for interference nulling is an operation tightly connected to the null convergence algorithm. The convergence algorithm, as will be described, performs interference detection, and is used to search, acquire and track polarization nulls within receive and detection constraints. The null control process is driven by $\gamma$ and $\phi$ modulation values to cover the polarization signal space and minimize integrated interference energy within a defined output bandwidth. The relationship between the A and B coefficients and $\gamma$ and $\phi$ variables is given in the earlier derivation and shown schematically in the FIG. 7. These computations can be performed in a controller, microprocessor or digital signal processor in the nulling DSP receiver, as will be described. Sigma processing can be accomplished using similar means, as shown in FIG. 7. Some economy can be achieved in the off-line computation when the application produces both the delta and sigma outputs.

The embodiment shown in FIG. 7 illustrates the partition of off-line coefficient computation 210 and the high speed pipeline operation 15 performed on the quadrature data by application of these coefficients using an arrangement of multiply-accumulator (MAC) operations and arithmetic summation of the matrix multiplications to produce the numeric delta output.

Figure 8:
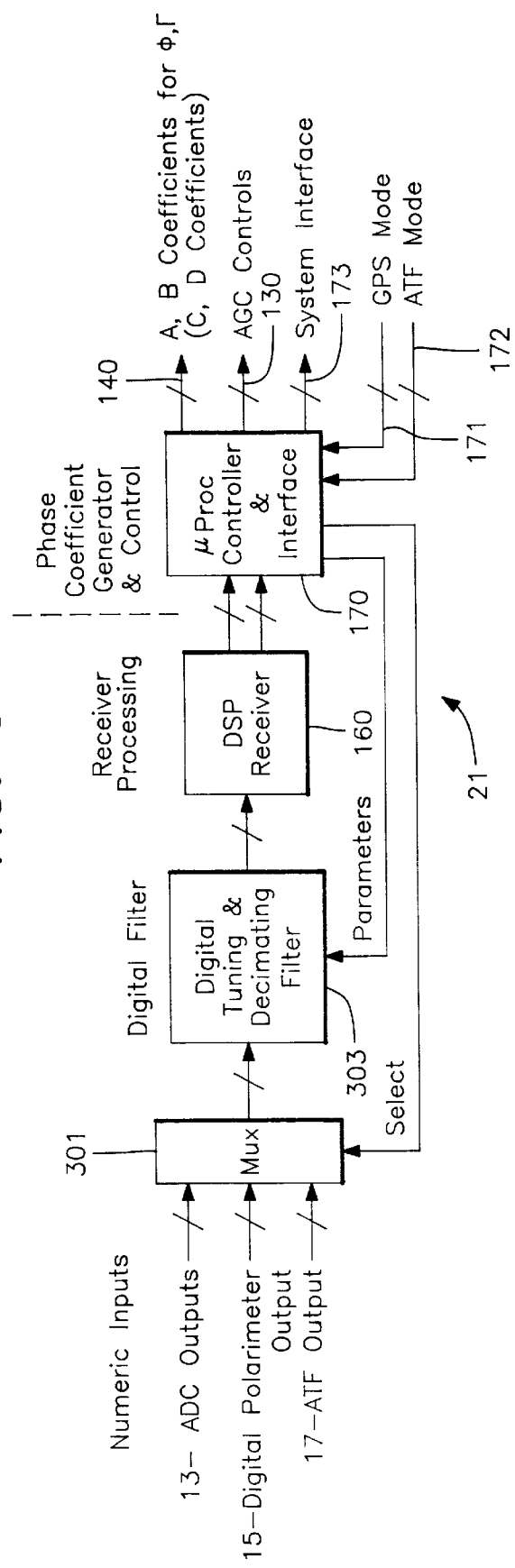
FIG. 8 is a block diagram of the nulling receiver and phase coefficient generator for the invention in FIG. 2.

Refer now to FIG. 8 showing an embodiment of the nulling receiver and phase coefficient generator 21 section of the invention. The receiver and coefficient generator 21 uses a multiplexed configuration and detects and integrates one of three numeric signals, either the output of the analog input ADC's 13, the output of the numeric/digital polarimeter 15, or the output of the adaptive transversal filter 17, and develops the AGC control commands over line 130 to set the linear dynamic range of the polarimeter and nulling arrangement, and generates the phase coefficients over line 140 to control the numeric polarimeter using the procedure describe above. Weight coefficients for the supplementary filter 17 are set independently in the filter 17 section automatically, as described. The system implements a conventional digital signal processing receiver configuration 160 followed by a general microprocessor controller 170 to exercise control and management of the arrangement responsive to the processed digital output and digital input signals for programming and updating AGC commands over 130 and phase coefficients over 140. Because of the series arrangement of the polarimeter 15 and supplemental filter 17, their performance is linked.

The microprocessor controller 170 and interface manages the receive and detection process, selects the numeric input, controls mode of operation, and computes the phase coefficients used in the high-speed pipeline portion (within 15) of the invention. The controller 170 is responsive to the GPS receiver mode over line 171 via a navigation receiver mode interface (not shown) and to system interfaces and operator commands (not shown) over 173. Typically, GPS receiver C/A-coded and P(Y)-coded modes result in selection of a complementary 2-MHz or 20-MHz maximum processing bandwidth for the receiver processing. The multiplexer 301 connects the numeric input data from 13, 15, 17 to the receiver. When connected to the ADC 13 outputs, the receiver 160 computes the optimum AGC settings for interference and GPS signal dynamic range control, and for optimum suppression. When connected to the digital polarimeter 15 output, the receiver 160 is used to control the polarimeter pipeline coefficients over line 140 and optimize suppression of interference by the numeric polarimeter 15. The controller 170 selects the processing bandwidth and ADC sampling rates. When connected to the adaptive transversal filter (ATF) 17 output, the receiver is used to control the polarimeter pipeline coefficients and optimize the combined suppression performance of the polarimeter when temporal filtering is performed. The controller 170 does not directly control the ATF 17 which would have a separate control function. The controller 170 is responsive to the ATF mode over line 172 and monitors the periodic ATF resets common with temporal filter implementations. Following each detected ATF mode reset, the controller may restart the polarimeter control function.

The selected numeric input is digitally tuned and filtered by digital filter 303 using well-known numeric mixing and decimating filter techniques familiar to those skilled in the art. The purpose of this stage is to establish a lower bandwidth for interference control decisions and coefficient processing. The output of the tuning function is processed by a detection processor which can be implemented using digital signal processor (DSP) 160 or equivalent technology compatible with the interference processing bandwidth. (Note that the bandwidths of the high-speed pipeline portion of the invention must be compatible with the GPS signal bandwidth, C/A or P(Y), and that detection and control need only be compatible with interference control and platform dynamic bandwidths.) Interference detection processing performed at this point is realized at detection bandwidths which can be significantly lower than the bandwidth of the composite numeric signal data. The output of the detection receiver consists of interference signal detections and signal strength in the bandwidth of interest.

The controller 170 function samples the output of the detection receiver 160 and responds to these measurements by modifying the phase coefficients to effect an optimum interference null over line 140, and/or to optimize AGC or sampling control over line 130 responsive to signal or navigation receiver changes. The control program and algorithms for the invention are executed in the controller 170.

Figure 9:
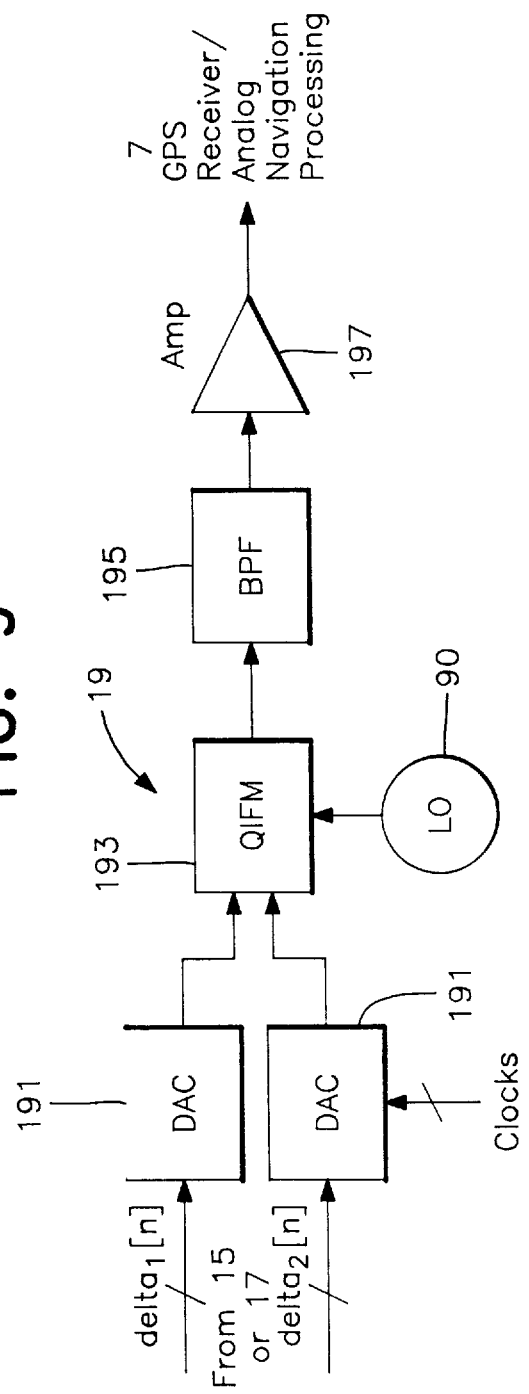
FIG. 9 is a block diagram of the output analog interface to a GPS receiver for the invention in FIG. 2.

Refer now to FIG. 9 showing the analog output conversion section 19 of the invention. This interface 19 is generated to provide a seamless RF or IF interface signal to a GPS or spread spectrum receiver 7. The numeric delta output from 15 or 17 as shown is converted to analog by digital-to-analog converters 191 (DAC) to produce a quadrature analog signal set using the input sampling rate or clock. The quadrature signals are upconverted using a QIFM 193 and a sample of the downconvert local oscillator LO 90 to the desired RF or IF interface band. Sufficient frequency stability and coherency of the local oscillator over the processing latency of the numeric polarimeter and encode/decode provides a seamless interface. The output signal from the QIFM is filtered in a bandpass filter (BPF) 195 to reduce out-of-band spurious signals and amplified (or attenuated) at 197 to the desired drive level for the output interface to the navigation receiver 7.

Figure 10:
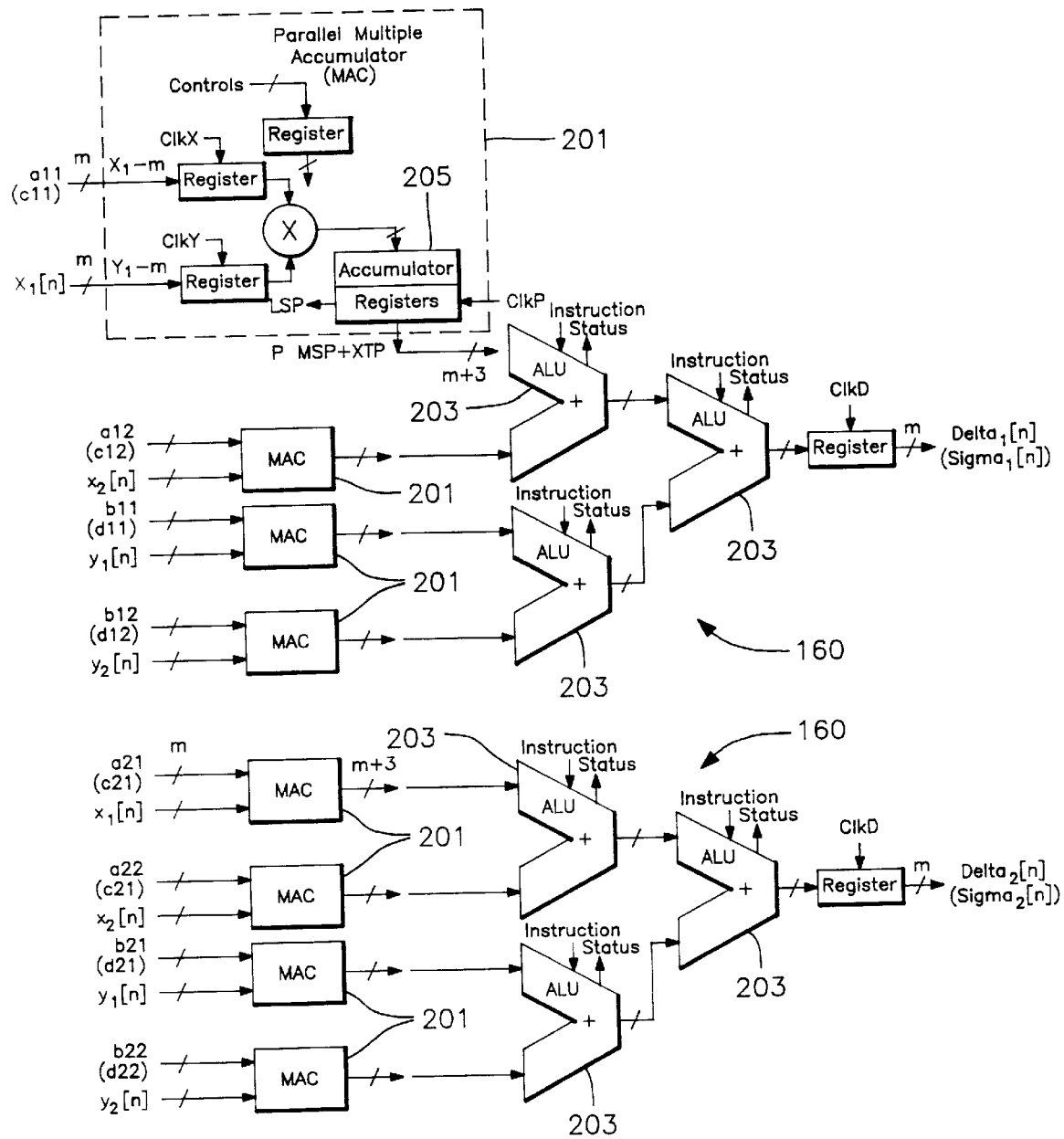
FIG. 10 is a block diagram of a parallel processing embodiment of the high speed pipeline numeric portion of the invention in FIG. 7.

Refer now to FIG. 10 showing a preferred embodiment of the high speed pipeline processing section within 15 of the invention. The arrangement shown in FIG. 10 illustrates a parallel clocked implementation of the pipeline process for the delta (or sigma) numeric output. The arrangement shown uses an array of registered mxm-bit parallel multiply accumulators (MAC's) 201 to perform the real-time clocked matrix multiply-accumulate operation on the input data. The output of the MAC's are functionally combined using arithmetic logic units (ALU's) 203 or simple adders to sum the matrix elements and form the quadrature outputs. The implementation of the MAC 201 and ALU 203 functions and its variations are familiar to those skilled in the art. A similar arrangement is parenthetically indicated in the figure for sigma real-time processing using the same structure.

As shown in the expanded detail view for a typical MAC 201, the m-bit X and Y operands are registered using edge triggering by the associated clock signal, and provided to an mxm multiplier array. The output of the multiplier commonly consists of a 2 m+3 bit output composed of the 2 m-bit product of the input operands and sign extended bits which are passed to an accumulator section 205. The output of the multiplier are latched after the accumulator which can be divided into three parts, an m-bit least significant product (LSP), an m-bit most significant product (MSP), and a 3-bit extended product (XTP) register. The XTP and MSP are the dedicated outputs. A control register for the MAC control bits may be latched using either of the input operand clock signals. The control bits are used in the multiply array to define two's complement or unsigned magnitude operation, accumulate mode, rounding, etc. The MAC output is latched by the associated product clock. All clocks are run at the ADC encode rate. The ALU's 203 sum the MAC outputs and are latched on the next edge of the clock cycle. The ALU's are configured for sum mode.

Figure 11:
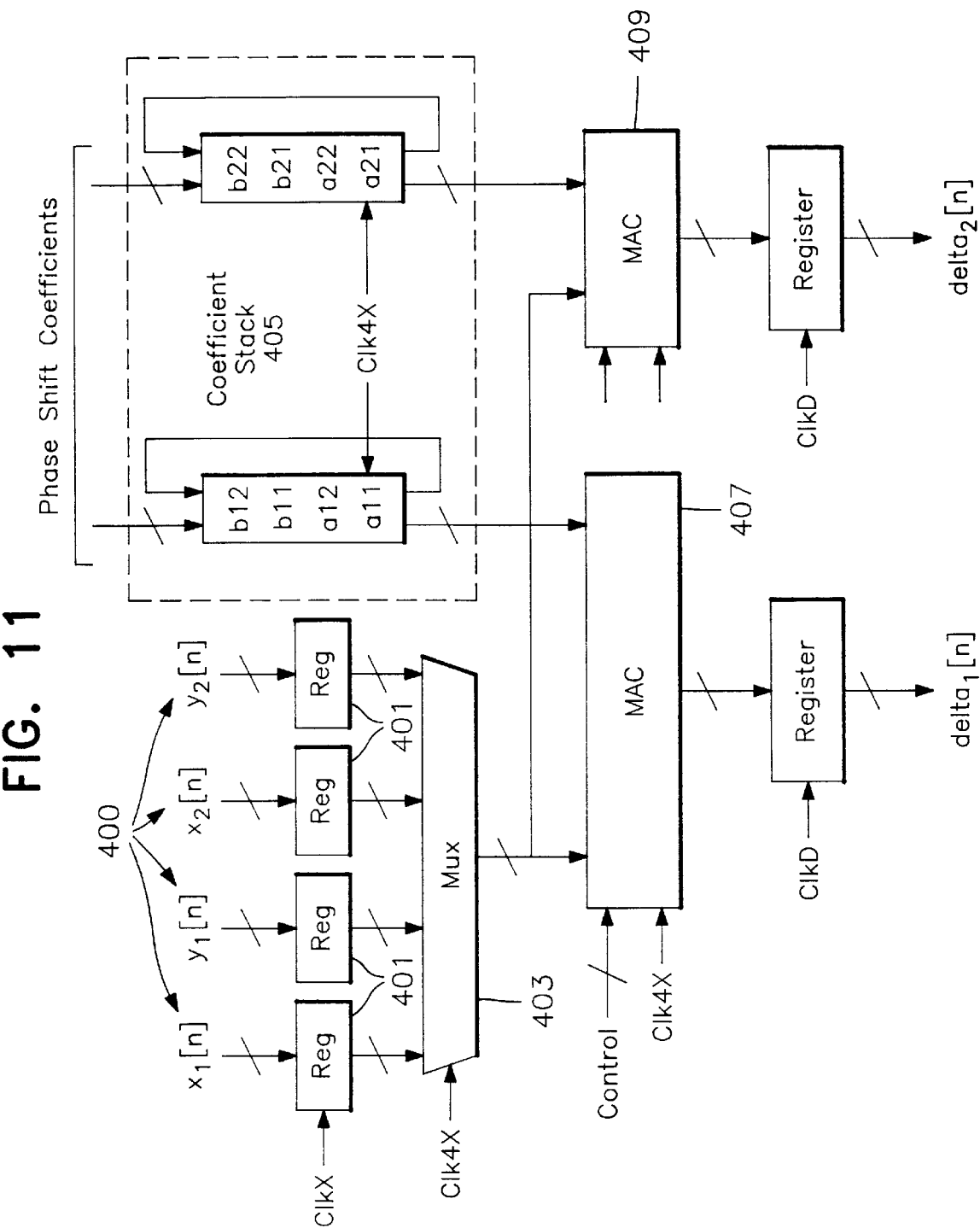
FIG. 11 is a block diagram of an alternative multiplexed processing embodiment of the high speed pipeline numeric portion of the invention in FIG. 7 for the delta port (and sigma port) implementation.

Refer now to FIG. 11 showing an alternate embodiment of the high speed pipeline processing section within 15 of the invention using a 4:1 multiplexing within the pipeline hardware. The arrangement shown in the figure illustrates an accumulator implementation of pipeline processing to reduce overall hardware. The arrangement shown operates internally at 4×the encode clock rate. The quadrature components 400 of the operands are latched in registers 401 at the encode rate and multiplexed at 403 at the internal rate. A recirculating coefficient stack 405 is shown which synchronously multiplexes the matrix coefficients with the operand data for a pair of quadrature MAC's 407, 409. The MAC's 407, 409 are configured in accumulate mode, whereby the product of a multiplication is added to the contents of the accumulator for each input sample, and reset for the next input sample. Operation of the MAC at four times the input rate allows the device to accumulate the quadrature numeric values and latch the output at the encode rate. The higher internal clock rate of the MAC generally increase dissipation in the device, but reduce complexity. For low encode rates (i.e. C/A-mode), the algorithm for the latter approach can be functionally embedded in system processing without the need for dedicated hardware.

Figure 12:
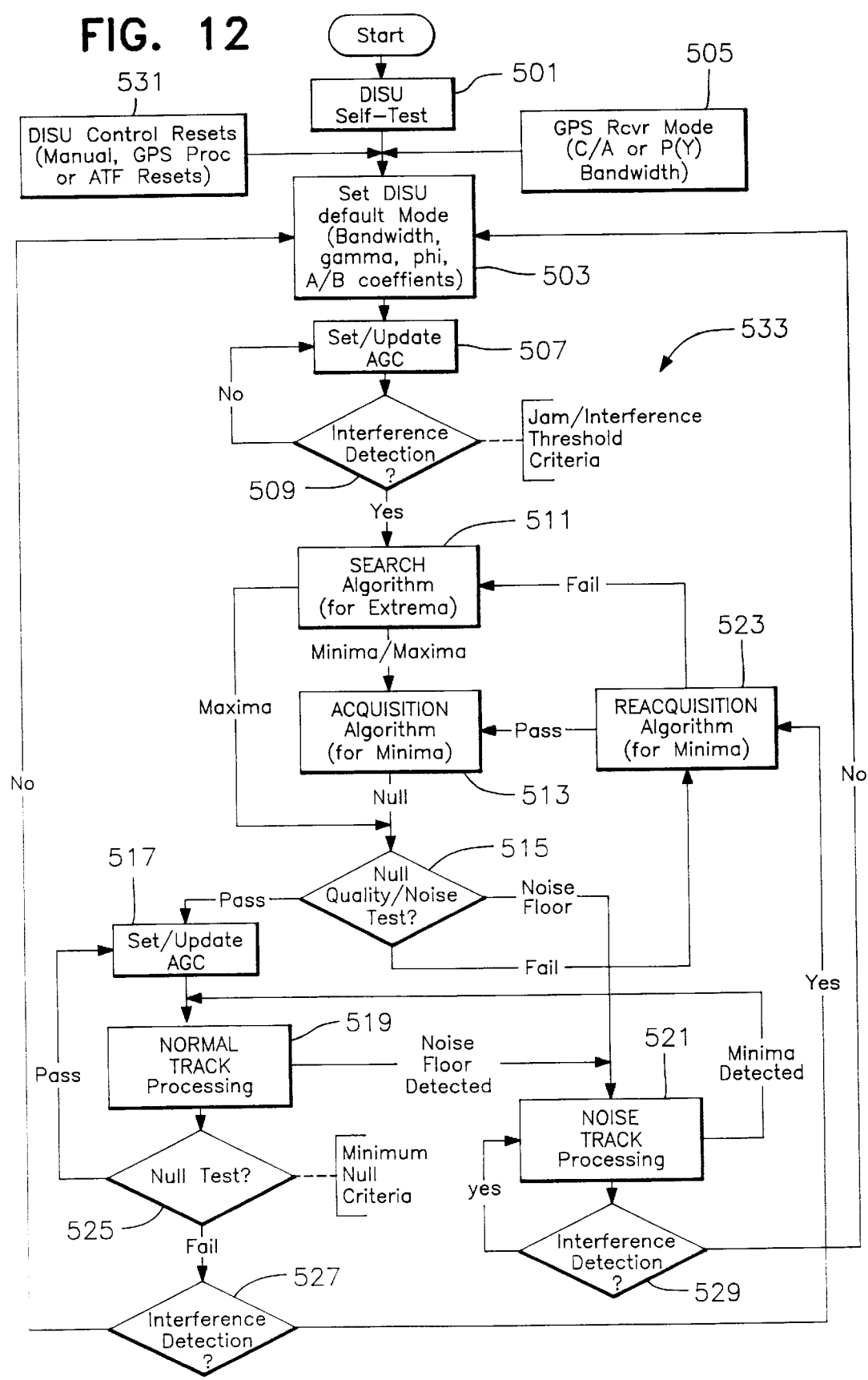
FIGS. 12 illustrates the top-level control algorithm for the analog and digital portions of the invention in FIG. 2.

Refer now to FIG. 12 showing a top level illustration of the processing for the receiver and control function of the invention in FIG. 8. The processing illustrated is performed in the microprocessor 170 of FIG. 8 and accomplishes the "off-line" (or non-real time) computation, control, and decision operations. The receiver and control processing function interfaces with the navigation receiver and adaptive filter control functions; sets the numeric polarimeter coefficients for default and interference nulling operations;

maintains system AGC for linear operation; processes the residual signal environment at the outputs of the polarimeter and filter; detects interference; controls the null search, acquisition and track algorithms by generating polarimeter coefficients; performs null and interference decision processing.

The control processing performs a system self-test 501 on initial start-up which sets the DISU high-speed pipeline, i.e., the numeric polarimeter, to a default mode 503 to receive and process GPS/GLONASS signals. Default mode is defined as an effective right hand polarization, for GPS/GLONASS, for the network preceding the spread spectrum receiver. The control processing reads the mode of the navigation receiver 505 (via path 171, FIG. 8) to establish the optimum processing bandwidth (C/A or P(Y), for 2-MHz or 20-MHz, respectively), or uses a preset mode if this interface is not available. The control processing reads the mode of the adaptive filter (via line 172, FIG. 8) and optimizes the polarization coefficients based on the detected residual interference environment before and after filtering. The control processing reassesses the polarimeter state after periodic adaptive filter resets to determine whether reset by return to default return to default or reacquisition of the polarimeter is necessary. The AGC is set or updated 507 each time the system returns to default mode or after an ATF reset. The AGC for the system is set based on received signal levels, and the control processing performs interference detection 509 using a programmed antijam threshold criteria. Detection of interference/jamming initiates a search algorithm 511 to systematically define the maxima and minima for nulling using a coarse grid of gamma/phi. Search is conducted by the generation of coefficients and examination of the polarimeter or filter output data by the receive function of the residual environment. Note that the environment may have some narrowband interferences suppressed by filtering. Extrema in the search output array (consisting of the largest maxima and minima) are identified and bracketed, by definition of their limits or ranges, and provided for subsequent processing. The acquisition algorithm 513 efficiently refines each of the bracketed minima into a candidate null which is subsequently tested for Max/Min quality (depth) and noise floor limitations. Each valid candidate null, operating above noise limitations, is passed 515 to the normal track algorithm 519 after AGC is updated 517. Each candidate noise floor null, i.e., a null operating into the noise of the system, is passed to the noise track algorithm 521. Each candidate null that successfully converges to a definable minima is tested by the null test at 525. The null test examines the relative level of the interference signal at the defined minima and compares this value to the current level of interference maxima defined in search 511. Null test success is defined as the difference between the interference minima and maxima exceeding a predefined depth of null, and/or minima level. If successful, AGC is updated 517, and the track process optimizes for the defined minima or null. If the null test fails and interference is present, the system control attempts reacquisition at 523 using the candidate minima and coarse search resolution. A successful reacquisition then hands off or passes the null through acquisition at 513. An unsuccessful reacquisition returns control to detection and search at 511.

Normal track maintains the polarimeter centered on the null, or optimum minima, and tests the null criteria, or signal level, at 525, while interference is present 527. Noise track 521 is intended to handle the case when the signal level of the interference after nulling brings its level below system sensitivity. This condition thus does not allow the control function to make a precise decision for null setting based on interference visibility. Noise track maintains the polarimeter centered on the estimated null as bracketed while interference is present 529. Loss of interference detection returns the system to default mode 503 and update of AGC 507. A control reset 531 may be produced by a change in the receiver mode, a reset of the adaptive transversal filter, etc. and causes the procedure to restart from default mode.

As previously discussed, the receiver 21 examines the digital signals at the input of the polarimeter 15 and the output of the polarimeter 15, or at the output of the optional ATF filter 17. The receiver 21 detects and integrates the peak level at the digital outputs of the ADC's 13 using processing bandwidth and rates suitable for SNR and sensitivity requirements. The implementation of the receive function is familiar to those skilled in the art. The process controls the AGC level to regulate the output signals for maximum gain corresponding to maximum ADC amplitude minus a backoff factor for head room. This process is performed when the interference/jam signal is present. The AGC gain for the quadrature components of the x-channel are set together (at 507, 517) based on the peak linear signal for maximum ADC resolution. The AGC gain for the y-channel is separately set (at 507, 517) using the same criteria for these signals. These values are periodically updated to maintain linear operation. When low peak interference or jamming levels are detected, or no interference or jamming is detected, the AGC gain is set to a high gain setting consistent with adequate resolution for operation of the polarimeter and filter, and a setting to achieve a necessary amplitude for signal detection by the ADC. Periodic update of these settings maintains linear operation of the arrangement responsive to changes in signal strength due to dynamics and pattern variation.

During detection (block 509), the receiver examines the output of the ADC 13 and detects interference and jamming based on peak and average energy criteria above a predefined jam threshold selected to match receiver anti-jam capability 533. This decision is based on examination of the input digital signal. An alternate embodiment detects the output of the polarimeter with the coefficients set to a default condition determined by the preferred right hand circular polarization receive sense for GPS or GLONASS.

Control of the numeric polarimeter 15 is achieved by calculation of the A and B coefficients corresponding to $\gamma/\phi$ values for polarization space operation. Internally, the definition of $\gamma/\phi$ uses a binary angle method (or BAM) to define phase angle using a defined number of bits and LSB (least significant bit). The selection of step resolution and LSB are dependent on null acquisition speed objectives, stability and dynamics. The BAM approach uses modulo-2 coding to simplify arithmetic and allow the algorithm to seamlessly process across the $\pi$ and $2\pi$ boundaries or edges of the cyclic $\gamma/\phi$ space.

Under an interference/jam detected condition (affirmative response at block 509) the receiver and coefficient generator follows a search, acquisition and track paradigm whereby the system examines the received energy level output of the polarimeter for a series of $\gamma/\phi$ setting steps using a grid trial pattern seeking to identify a minimum level.

Figure 13:
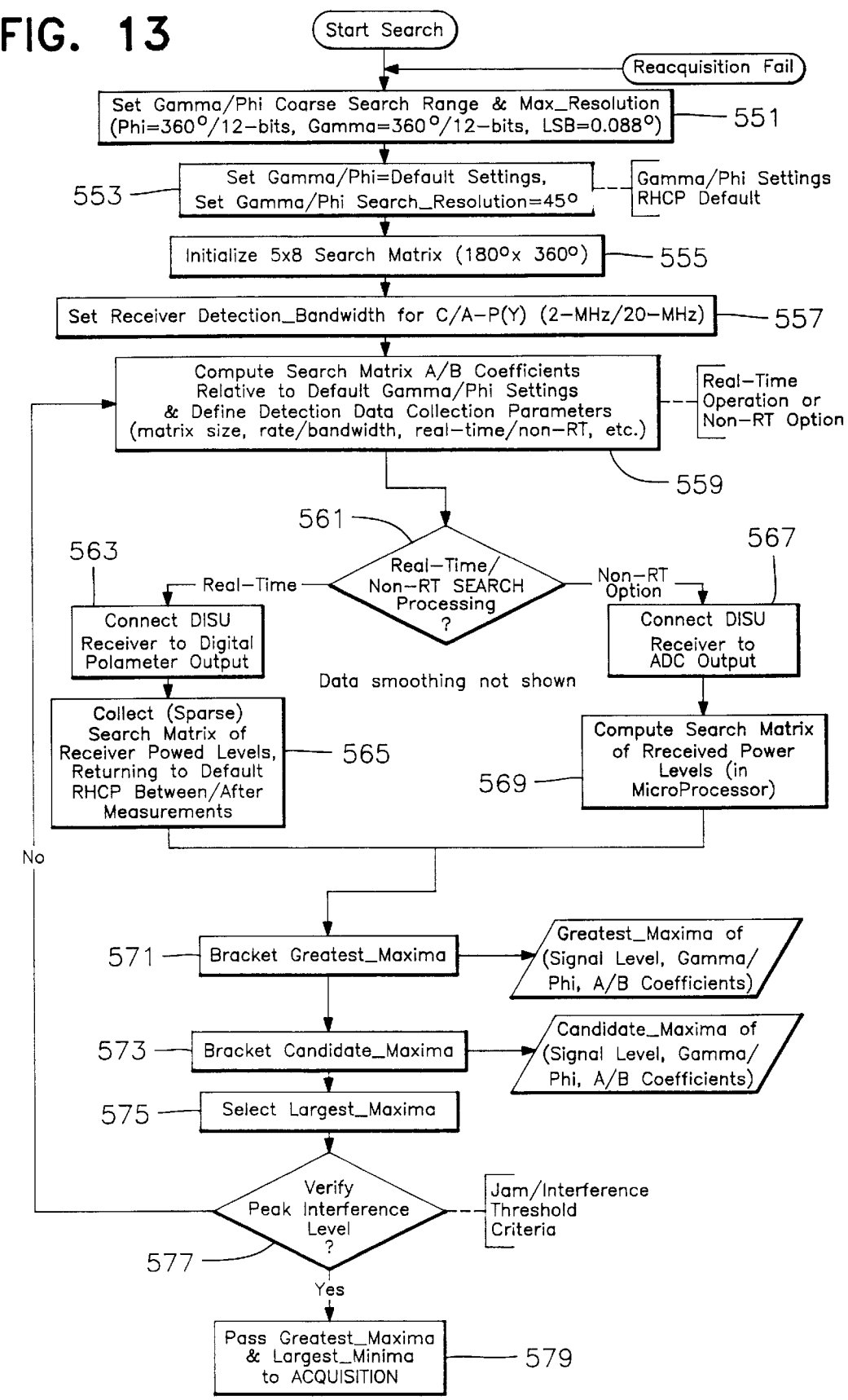
FIG. 13 illustrates the top-level search algorithm for detection of interference maxima and minima for the control algorithm in FIG. 12.

Refer now to FIG. 13 which illustrates the search algorithm. In search, the procedure first examines the $\gamma/\phi$ phase space using a coarse series of phase resolution steps to cover a $\pi$ by $2\pi$ representation of $\gamma/\phi$ space. One embodiment of this approach uses a pseudo-random sparse matrix collection technique to speed determination of extrema (minima and maxima). The inherent linearity of the numeric polarimeter allows the algorithm to systematically map $\gamma/\phi$ space, i.e., the surface of the Poincaré sphere. The search matrix of detected energy is examined for the greatest minima and greatest maxima, and enters acquisition. The greatest minima is used as initial conditions for subsequent steps. The greatest maxima is used to test for depth of null. The search process is performed after interference is detected, or following failure of the reacquisition process.

One embodiment of the search process utilizes a numeric control which is equivalent to a coarse setting of the gamma/phi modulators over the full $\pi$ by $2\pi$ space (551). The numeric search implementation is performed by selection of a digital resolution, or bit weight for the binary arithmetic, at a programmable search resolution, for instance 45° or $2\pi/2^3$ radians (553). For the case of a 12-bit BAM system, 360° and 12-bits, bit #9 would be defined as 45°, with bit#12 the LSB or $2\pi/2^{12}$ radians. The figure illustrates a 12-bit numeric system covering 360° and having an LSB of 0.0879° at 551. The binary angle measurement approach allows a simplified wrap of the $\gamma/\phi$ angle. The search matrix of 180°×360° that maps the polarization space uses a 5×8 matrix (555). The receiver function in FIG. 8 is configured for the required processing bandwidth for search (557). The procedure computes the A/B coefficients for the coarse search angles in the search matrix relative to the (RHCP) default preset values for the polarimeter (559). The data collection parameters are developed for real-time or non-real-time collection of data in hardware storage. One embodiment of real-time processing utilizes high-speed fixed function digital hardware or high-speed DSP technology operating at the pipeline throughput rate of the data. An embodiment of non-realtime processing may utilize a flexible general purpose microprocessor or DSP approach. For real-time operation, the selected input to the DISU receiver 21 is the output of the polarimeter 15 (at 563). A search matrix of polarimeter output data is collected and buffered for each A/B setting of the search matrix (565). Real-time input data collection and storage is performed and implemented using a pseudo-random pattern or sequence of matrix cell addresses with a return to the default state between each collection point, so as to preclude the setting or dwelling of the polarimeter at non-preferred states for any period of time, i.e., states that would result in a mismatch to the desired GPS/GLONASS signal. An alternate implementation using non-RT processing is shown in the figure, and directly uses the output of the ADC (or input to the polarimeter) (567). The non-RT procedure collects and stores measurement data at real-time, but processes this data off-line, at non-realtime (569). Non-RT procedures may be used: when processing speed is not critical; when search monitor is being performed as a background function; or when the optional ATF filter is connected to the polarimeter output and operating. The objective of non-RT processing is to not impact real-time processing, or operate as a background function. Data collection, storage and processing can use alternate algorithms with improved numeric or processing efficiencies since the non-RT processing of search decisions is performed off-line in the microprocessor and does not impact real-time performance. In non-RT operation the high-speed pipeline can use auxiliary A/B coefficients to support ATF operation, or default settings for RHCP GPS receive, etc.

The procedure examines the search matrix and brackets the greatest maxima to ascertain interference peak signal strength using common numeric and programming procedures (571). The maxima is later used to test for the presence of strong interference and to test minima null depth. The process also detects and brackets each candidate minima using common numeric and programming processing techniques (573). At the search resolution, each minima only represents a candidate null possibility. Due to antenna anomalies multiple minima may be observed within the search matrix. The largest minima is initially selected for acquisition (575). The greatest maxima is compared to a preprogrammed jam threshold (577). If the jam threshold is exceeded, we pass the largest minima and greatest maxima to the acquisition procedure (579). If the jam threshold is not exceeded, we return to the search matrix collection (559) and repeat the process until an interference level with sufficient strength is detected. The original A/B coefficients are used for search, since the default definition has not changed. The procedure again determines real-time or non-RT operation, and follows the appropriate path.

Figure 14:
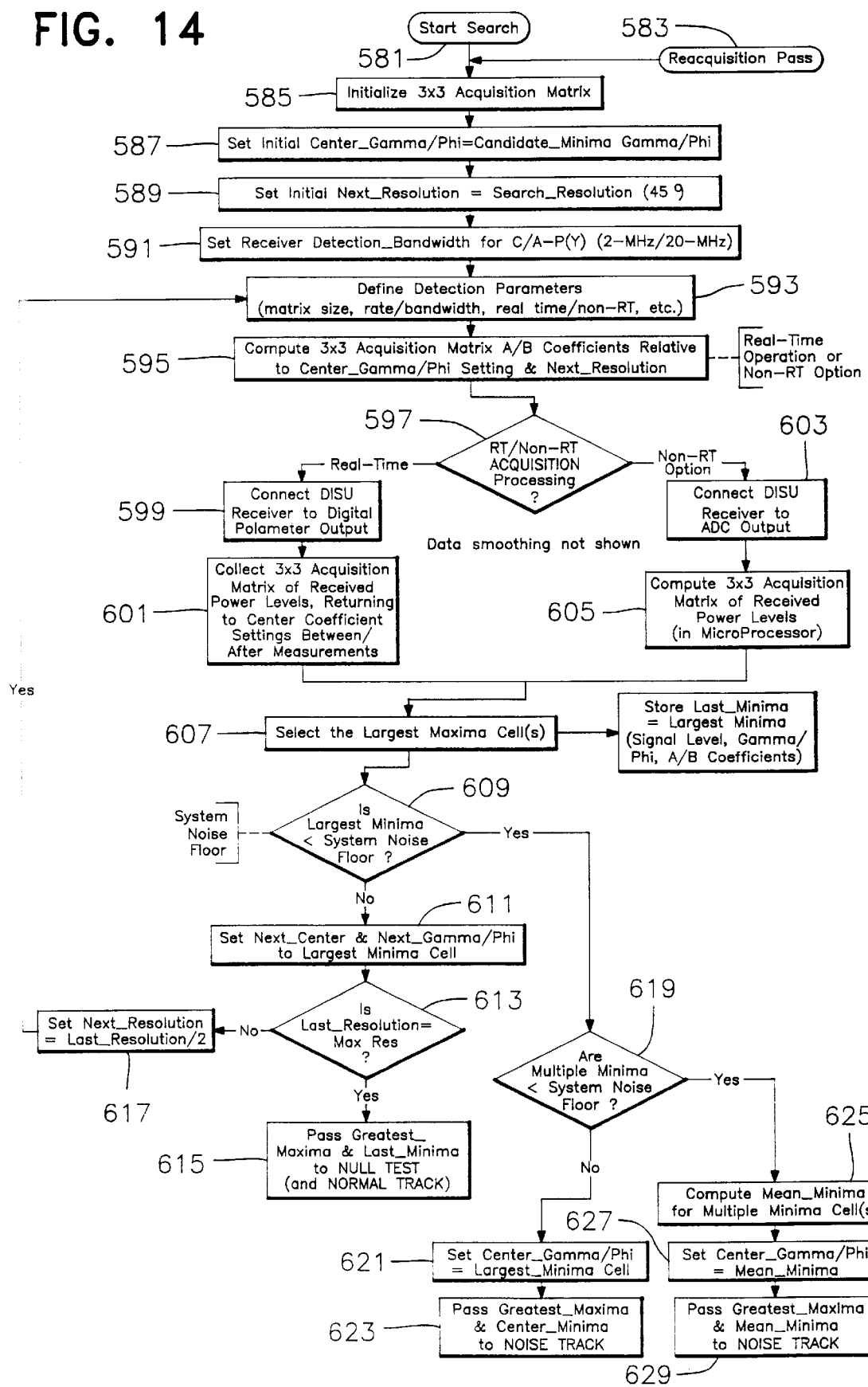
FIG. 14 illustrates the top-level acquisition algorithm for acquisition of interference minima detected for the control algorithm in FIG. 12.

Refer now to FIG. 14 which illustrates the acquisition algorithm. In acquisition, the minima is bracketed and a convergence methodology is used to locate, or acquire, the optimum null setting in both $\gamma$ and $\phi$. One embodiment of the convergence method uses a iteration of binary reduced $\gamma/\phi$ resolution to bracket the null. The resolution starts using the coarse search step value and the greatest minima as the initial center value. A reduced 3×3 matrix of detected amplitude surrounding the center $\gamma/\phi$ setting is examined to evaluate the next largest minima. This technique applies a downhill multi-dimensional minimization method using function evaluations, rather than function derivatives or gradients. The evaluated minima of the 3×3 measured energy values become the next center value for subsequent iterative steps and measurements. The $\gamma/\phi$ step resolution is reduced in a binary manner, or halved, making the resolution finer and the process repeated to determine the next candidate center/null. If the greatest minima can not be determined because of numeric resolution, the measurement cycle is repeated and the measurements averaged to improve the decision resolution. The process iteratively repeats until the goal $\gamma/\phi$ phase step resolution is achieved, or the evaluated energy level of the null signal approaches the system noise floor. The value of the candidate minima is tested against the greatest maxima to assure proper null dynamic range, i.e., greater than a preset ratio. If the ratio of the greatest maxima to the noise floor is less than the preset ratio, the noise floor criteria shall prevail. If in the Null Test, the null satisfies preset criteria, the system begins null track. If the null is under the preset ratio or noise floor value, the conclusion may result from a false local null, a saddle point, multiple interferences, a noise spike, an anomaly, etc. For these cases, the processing $\gamma/\phi$ resolution routine is passed to reacquisition and restarted at the point where it previously found a minima using the search step resolution. Restart of the routine at this point is efficient, since the algorithm converged to this point. Convergence of the routine to a null or minima above the system noise floor and which satisfies maxima/minima criteria causes the process to change to normal track. Convergence of the routine to a finite system noise floor causes the process to change to noise track. At each resolution step, if a single noise floor minima cell is detected, Noise Track is initiated using that cell as the center of the track. If multiple noise floor minima cells are detected, the procedure computes the mean $\gamma/\phi$ value of the noise floor cells and initiates Noise Track at this central value.

Referring to FIG. 14, the acquisition procedure starts (581) with a handoff from search, or as a result of a successful reacquisition (583). Acquisition examines the $\gamma/\phi$ phase space using a contracting series of resolution steps in $\gamma/\phi$. One embodiment of this approach uses a 3×3 acquisition matrix (585) to detect energy and examine for the greatest minima. The acquisition process utilizes a numeric control with an initial resolution setting of the gamma/phi modulators equal to the search resolution, or bit weight, for instance 45° or $2\pi/2^3$ radians (589). The acquisition matrix varies in angular resolution, starting with 90°×90° that maps the polarization space using a 3×3 matrix. The receiver function in FIG. 8 is configured for the required processing bandwidth for acquisition (591). The procedure computes the A/B coefficients (595) for the acquisition angles in the matrix relative to the center $\gamma/\phi$ values handed off by search or reacquisition (587). The data collection parameters are developed for real-time or non-real-time collection of data in hardware storage. For real-time operation, the selected input to the DISU receiver is the output of the polarimeter (599). An acquisition matrix of polarimeter output data is collected and buffered for each A/B setting of the acquisition matrix (601). Real-time input data collection and storage is performed and implemented using a sequence of matrix cell addresses with a return to the center state between each collection point, so as to maximize the time at the current null. An alternate implementation using non-RT processing is shown in the figure, and directly uses the output of the ADC (or input to the polarimeter) (603). The non-RT procedure collects and stores measurement data at real-time (605), but processes this data at non-realtime. Non-RT procedures may be used for the same reasons as in search. The procedure examines the acquisition matrix and selects the largest minima in the matrix (607). The largest minima is compared to the system noise floor (609). If the minima is above the noise floor, or within the dynamic range of the system, the procedure selects the minima of the next center (611) and tests the last $\gamma/\phi$ resolution relative to the maximum resolution or LSB (613). If the system is at maximum resolution (613), the acquisition procedure passes the last minima to a Null Test and then to Normal Track (615). If the last resolution is greater than the maximum resolution, the procedure sets the next resolution to half of the last resolution (617) and repeats the 3×3 acquisition matrix iterative process, effectively recentering the procedure on the current minima and contracting the acquisition window. If the largest minima is below the noise floor threshold (609), the procedure exits the iterative loop and examines the matrix for multiple cells satisfying this criteria (619). If only a single cell is below the noise floor, the procedure sets the center $\gamma/\phi$ at the largest minima (621) and passes this information and the resolution to Noise Track (623). If multiple cells are detected below the noise floor, the procedure computes the mean $\gamma/\phi$ for the noise cells (625) and passes the mean information to Noise Track (629).

Figure 15:
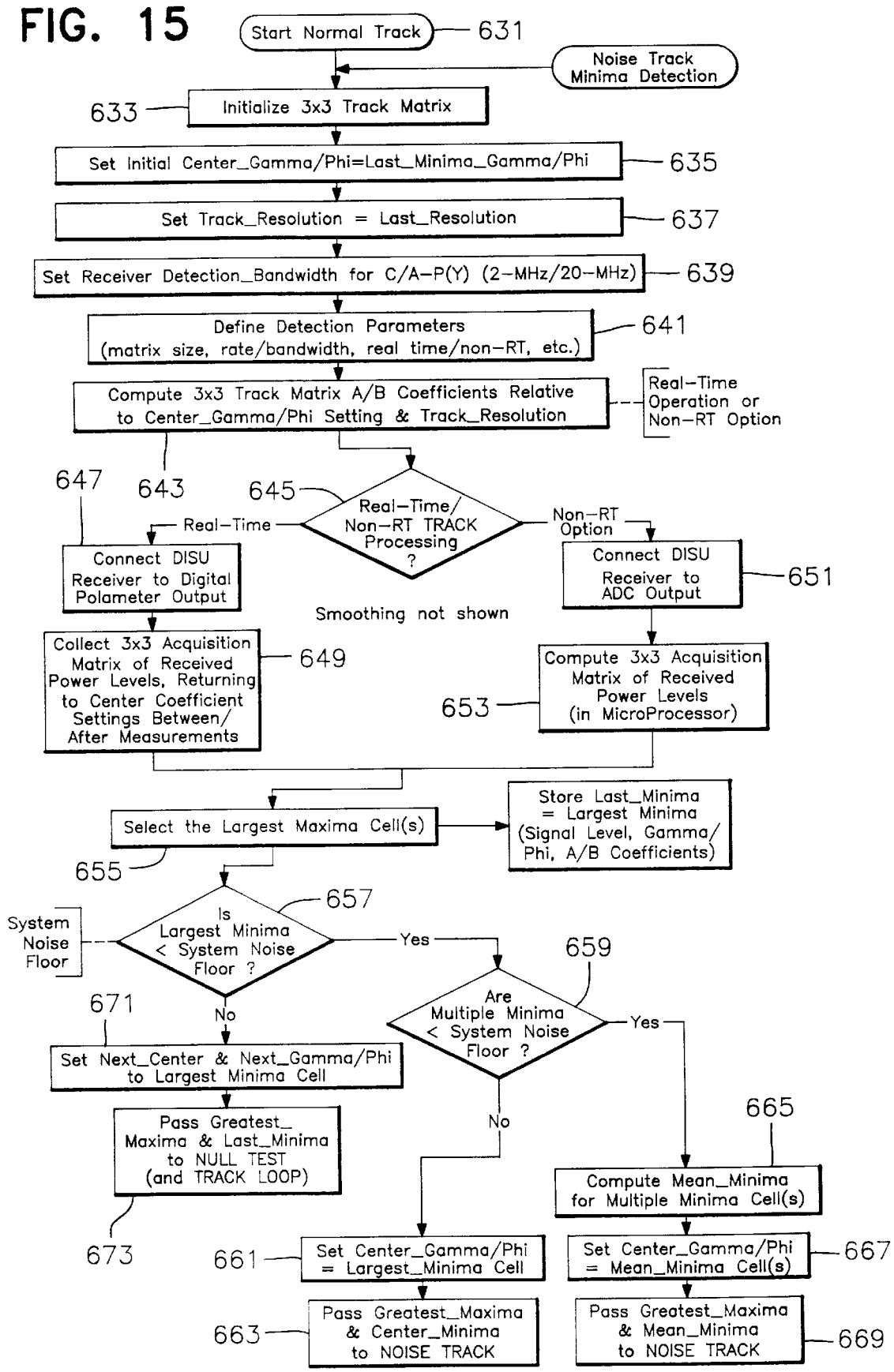
FIG. 15 illustrates the top-level track algorithm for normal track of interference minima above the system noise floor for the control algorithm in FIG. 12.

Refer now to FIG. 15 which illustrates the normal track algorithm. In normal track, the process examines the 3×3 matrix of minima at the goal step resolution, and uses the largest minima as the center value, or null setting. A periodic search matrix may be collected (calculated) in the background to verify interference/jam detection and determine the greatest maxima for null depth verification. If the null depth ratio relative to the greatest maxima falls below preset criteria, the system returns to acquisition using the last search matrix and repeats the routine. Loss of interference/jam as indicated by loss of maxima, returns the system to default settings and jam detection.

Referring to FIGS. 15 and 12, the normal track procedure starts with a handoff from acquisition (631). Normal Track examines and adjusts the $\gamma/\phi$ null phase space using a goal $\gamma/\phi$ resolution. One embodiment of this approach uses a 3×3 track matrix (633) to detect energy and examine the greatest minima. The track process utilizes a numeric control with a goal resolution setting of the gamma/phi modulators equal to the last resolution, or bit weight, used in acquisition (637). This resolution would ideally be the maximum resolution or LSB. The track matrix uses a constant angular resolution for the 3×3 matrix. The receiver function in FIG. 8 is configured for the required processing bandwidth for normal track (639). The procedure computes the A/B coefficients for the track angles in the matrix relative to the center $\gamma/\phi$ values handed off by acquisition (643). The data collection parameters are developed for real-time or non-realtime collection of data in memory storage (645). For real-time operation, the selected input to the DISU receiver is the output of the polarimeter (647). A track matrix of polarimeter output data is collected and buffered for each A/B setting of the track matrix (649). Real-time input data collection and storage is performed and implemented using a sequence of matrix cell addresses with a return to the center state between each collection point, so as to maximize the time at the last track null. An alternate implementation using non-RT processing is shown in the figure, and directly uses the output of the ADC (or input to the polarimeter) (651). The non-RT procedure collects and stores measurement data at real-time, but processes this data at non-realtime (653). Non-RT procedures may be used for the same reasons as in search and acquisition. The procedure examines the track matrix and selects the largest minima in the matrix (655). The largest minima is compared to the system noise floor (657). If the largest minima is below the noise floor threshold, the procedure exits the iterative track loop and examines the matrix for multiple cells satisfying this criteria (659). If only a single cell is below the noise floor, the procedure sets the center $\gamma/\phi$ at the largest minima (661) and passes this information to Noise Track (663). If multiple cells are detected below the noise floor, the procedure computes the mean $\gamma/\phi$ for the noise cells (665), sets the center $\gamma/\phi$ to the mean $\gamma/\phi$ (667) and passes the mean information to Noise Track (669). If the minima is above the noise floor, or in the dynamic range of the system, the procedure recenters the track algorithm. If the largest minima is above the system noise floor, the procedure sets the next center cell $\gamma/\phi$ to the minima $\gamma/\phi$ (671). The procedure passes the next minima and last maxima to the Null Test to test for null depth (673). If the null test passes, the track loop is repeated using the next minima for the center minima. The AGC for the process is updated to maintain maximum dynamic range. On reentering the track procedure, the 3×3 track matrix iterative process effectively recenters the procedure on the current minima and uses the same track window to repeat the process.

Figure 16:
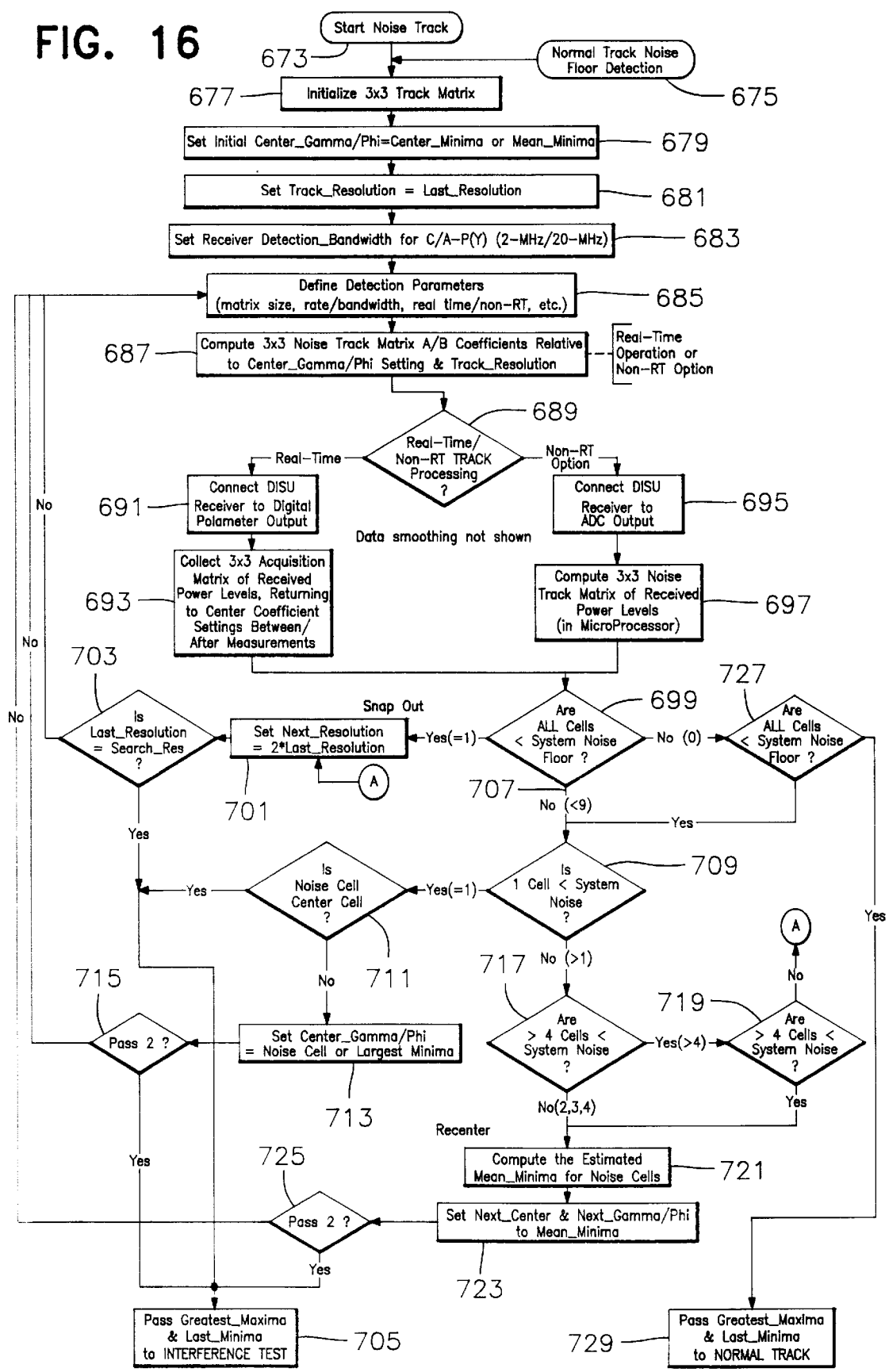
FIG. 16 illustrates the top-level noise track algorithm for noise floor track of the interference minima region under sensitivity limits for the control algorithm in FIG. 12.

Refer now to FIG. 16 which illustrates the noise track algorithm. In noise track, the process brackets the detected noise floor in $\gamma/\phi$ and estimates a centroid setting for the null. The process examines a 3×3 matrix of measurements to define the extent of the noise floor by measuring the energy for $\gamma/\phi$ settings that are above noise, and either bisects the difference in $\gamma/\phi$ brackets, or computes the centroid of the space enclosed by valid $\gamma/\phi$ measurements, or computes the mean value of the noise cells. The precise setting of the null is not critical under these conditions because of the loss of suppressed interference visibility. Loss of interference/jam signal strength as indicated by loss of maxima, returns the system to default settings and to jam detection.

Referring to FIGS. 16 and 12, the noise track procedure starts (673) with a handoff from acquisition via the null quality/noise test by detection of noise floor levels, or via normal track detection (675) of noise cells during the track procedure. Noise Track continuously examines and adjusts the γ/φ null phase space using the last γ/φ resolution. One embodiment of this approach uses a 3×3 noise track matrix to detect energy and examine for the largest minima. The track process utilizes a numeric control with a resolution setting of the gamma/phi modulators equal to the last resolution, or bit weight, used in acquisition or track (681). The noise track resolution will be that resolution that allows detection in the 3×3 matrix of valid signal and noise levels. This resolution can be the maximum resolution or LSB, or can increase/expand to as large as the search or max resolution. The receiver function in FIG. 8 is configured for the required processing bandwidth for noise track (683). The procedure computes the A/B coefficients for the noise track angles in the matrix relative to the center γ/φ values handed off by acquisition, or normal track, or track iteration (687). The data collection parameters are developed for real-time or non-RT collection of data in hardware storage (689). For real-time operation, the selected input to the DISU receiver is the output of the polarimeter (691). A noise track matrix of polarimeter output data is collected and buffered for each A/B setting of the noise track matrix (693). Real-time input data collection and storage is performed and implemented using a sequence of matrix cell addresses with a return to the center state between each collection point, so as to maximize the time at the last null. An alternate implementation using non-RT processing is shown in the figure, and directly uses the output of the ADC (or input to the polarimeter) (695). The non-RT procedure collects and stores measurement data at real-time, but processes this data at non-realtime (697). Non-RT procedures may be used for the same reasons as in search, acquisition and normal track. In the case of noise track non-RT procedures additionally allow the invention to evaluate multiple/alternate methods to select resolution and null center.

The procedure examines the noise track matrix and detects the noise cells in the matrix (699). If ALL the cells in the 3×3 matrix are at or below the noise floor, the procedure expands the resolution of the process, or snaps out, by setting the next resolution to twice (×2) the last resolution (701) and repeating the noise track collection process. If the last resolution is the search resolution or max resolution (703), the process exits the loop and passes the last minima (noise floor) and the greatest maxima to interference detection to test for interference signal strength (705). In one embodiment, if multiple noise cells are detected in the 3×3 matrix, but less than all 9 cells (707), the procedure attempts to center on the mean value of the noise cells. The procedure examines the matrix for the multiple noise cells. If only a single cell is below the noise floor (709), the procedure recenters the matrix by setting the center γ/φ to the single noise cell (711,713) and repeats the noise track collection process without changing resolution. While only a single noise cell is detected at this resolution, the procedure continues to recenter the matrix in a loop. On the second iteration of this loop (715), the procedure exits and passes the last minima information to the interference detection test (705) and remains in a noise track loop until the interference signal strength fall below the jam threshold, or the minima cell is greater than the noise floor.

If multiple cells are detected below the noise floor, the procedure evaluates the number of noise cells and the clustering of these cells (717). If greater than 4 cells are noise and are not clustered (719) (not neighboring), the procedure expands the resolution of the process, or snaps out (701), by setting the next resolution to twice (×2) the last resolution and repeats the noise track collection process. If the last resolution is the search resolution or max resolution (703), the process exits the loop and passes the mean minima and the greatest maxima to interference detection to test for interference signal strength (705). If 2, 3 or 4 noise cells are detected, the procedure computes the mean γ/φ for the noise cells (721) and recenters the matrix by setting the next center to the mean minima (723), and repeats the noise track collection process. On the second iteration of the multiple noise cell loop (725), the procedure exits and passes the mean information to the interference detection test (705) and remains in a noise track loop until interference signal strength maxima falls below the jam threshold, or the minima cell is greater than the noise floor. If the greatest minima cell is above the noise floor (727), the procedure passes the last minima to the Normal Track procedure (729). The AGC for the DISU is not updated in noise track because the dynamic range is assumed to set at the bottom of the sensitivity range. On reentering the noise track procedure, the 3×3 track matrix iterative process, effectively recenters the procedure on the current minima or mean noise cell and uses the same track window to repeat the process.

Figure 17:
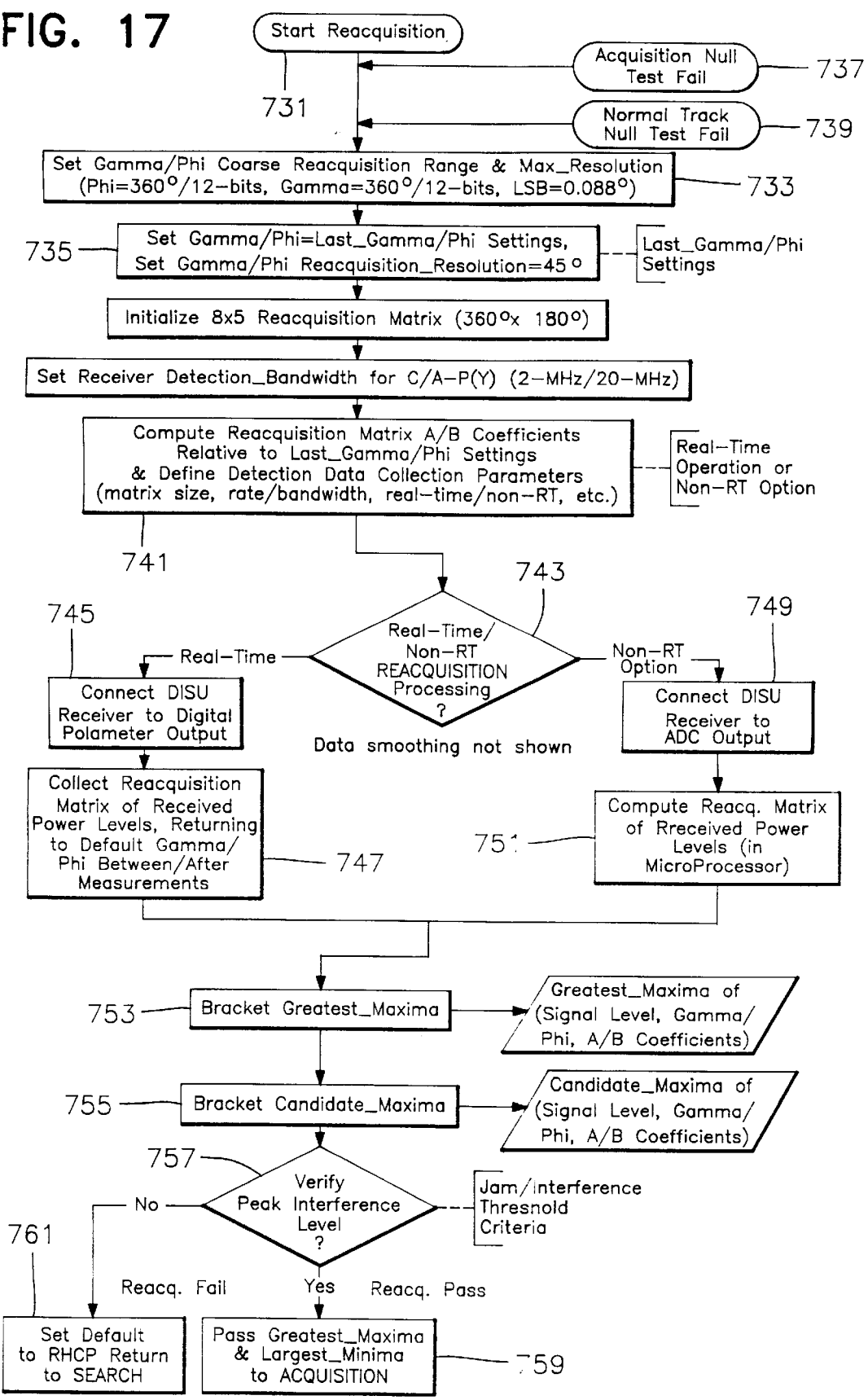
FIG. 17 illustrates the top-level reacquisition algorithm for reacquisition of interference minima that fail the normal track process for the control algorithm in FIG. 12.

Refer now to FIG. 17 which illustrates the reacquisition algorithm. In reacquisition, the process handles failed acquisition or failed normal track because of poor null quality. Poor null quality is defined as unsatisfactory null depth, the relationship between greatest maxima and largest or last minima. The procedure duplicates an abbreviated search examining the γ/φ phase space using a coarse series of phase resolution steps to cover π by 2π γ/φ space using a 5×8 matrix with initial default settings passed by the procedure that passed to reacquisition and resolution set at the search resolution.

Referring to FIGS. 17 and 12, the reacquisition procedure starts (731) with a handoff from acquisition or normal track via the null quality/noise test by detection of inadequate null. The default γ/φ is set to the last gamma/phi (735), and the resolution is set to the search resolution (733). Resolution is not changed within the reacquisition process. The receiver function in FIG. 8 is configured for the required processing bandwidth for noise track. The procedure computes the A/B coefficients (741) for the reacquisition angles in the matrix relative to the γ/φ values handed off by acquisition (737), or normal track (739). The data collection parameters are developed for real-time or non-RT collection of data in hardware storage (743). For real-time operation, the selected input to the DISU receiver is the output of the polarimeter (745). A reacquisition matrix of polarimeter output data is collected and buffered for each A/B setting of the reacquisition matrix (747). Real-time input data collection and storage is performed and implemented using a sequence of matrix cell addresses with a return to the default γ/φ state between each collection point, so as to maximize the time at the last null. An alternate implementation using non-RT processing is shown in the figure, and directly uses the output of the ADC (or input to the polarimeter) (749). The non-RT procedure collects and stores measurement data at real-time, but processes this data at non-realtime (751). Non-RT procedures may be used for the same reasons as in acquisition. The procedure examines the reacquisition matrix and brackets the greatest maxima to ascertain interference peak signal strength (753). The maxima is later used to test for the presence of strong interference and to test minima null depth. The process also selects the candidate minima (755). The greatest maxima is compared to a preprogrammed jam threshold (757). If the jam threshold is exceeded, we pass the largest minima and greatest maxima to the acquisition procedure (759). If the jam threshold is not exceeded, we reset the default to RHCP and return to the search procedure matrix collection (761) and repeat the process until a maxima interference level with sufficient strength is detected.

A software Watchdog function in the receiver 21 is used as a safeguard to prevent the setting of the DISU to null GPS/GLONASS signal. The Watchdog detects setting or migration of the DISU algorithm to the equivalent of LHCP, or a RHCP, null. The setting of the DISU pipeline is periodically compared to a preprogrammed window defined as a RHCP null. If the DISU algorithms converges into this range, the system is prevented from acquisition or tracking and returned to search.

When the supplemental ATF filter 17 detects and suppresses narrowband interference in a series configuration, the receiver 21 monitors the output signal from the filter to examine the residual signal environment for detection of residual interference/jamming for polarimeter nulling. In this mode of operation, the filter 17 is first used to suppress narrowband interference, and the digital polarimeter 15 is used to detect and suppress the residual environment, or wideband interference in the environment.

The foregoing description of the architecture of particular embodiments of a digital polarimeter according to the invention is intended as illustrative of, and not limiting of, the scope of the invention, which generally comprises a first circuit section for conversion of the orthogonal signals to baseband; a second section circuit for regulating the power of the quadrature signal pairs; a third section for digitizing the received signals contaminated by interference/jamming; a fourth section wherein the digital polarimeter elements perform polarization modulation using phase coefficients; a fifth supplementary section wherein digital processing elements perform finite-impulse-filtering of the digitized signals; a sixth section wherein digital processing elements perform receiver processing of the output delta signal and compute phase control coefficients for the numeric polarimeter according to defined search, acquisition and track algorithm to suppress interference in the received signals; and a seventh section wherein the output delta signal in numeric or analog form is provided in an interface to the spread spectrum of GPS receiver. The invention being thus disclosed, variations and modifications of a digital polarimeter according to the invention, or section thereof, will occur to those skilled in the art, and are intended to be within the spirit and scope of the invention, as defined in the following claims:

We claim:

1. A digital adaptive suppression system for suppressing interference and jamming signals from a spread spectrum signal, the system comprising, an antenna system for receiving the spread spectrum signal and any inband interference and jamming signals and dividing the received signals into two orthogonally polarized analog antenna output signal components;

analog-to-digital conversion means for converting each of said two orthogonally polarized analog output signal components to digital inputs;

a digital polarimeter for receiving the digital inputs and for receiving digital phase shifting coefficients from a coefficient generator to provide a digital polarimeter output representing the spread spectrum signal with the interference and jamming signals suppressed;

a coefficient generator connected with said digital polarimeter for generating the phase shifting coefficients and repetitively updating the phase shifting coefficients until the digital polarimeter output is at a minimum representing the spread spectrum signal with interference and jamming suppressed.

2. The digital adaptive suppression system of claim 1 wherein said antenna system receives global positioning satellite (GPS) signals in frequency bands L1 and L2 and divides at least one of the GPS L1 and L2 signals into two orthogonally polarized antenna output signal components.

3. The digital adaptive suppression system of claim 2 wherein said analog-to-digital conversion means comprises a balanced converter means for converting each of the two orthogonally polarized analog output signal components to a baseband frequency range, an automatic gain control means for receiving the output of said balanced converter means and for generating a pair of power-regulated analog signals from said output, and an analog-to-digital converter for converting each of said pair of power-regulated analog signals to said digital inputs.

4. The digital adaptive suppression system of claim 3 wherein said balanced converter means further includes means for converting each of said two orthogonally polarized analog output signals into quadrature components at a baseband frequency.

5. The digital adaptive suppression system of claim 4 wherein said automatic gain control means comprises means to control the gain of the quadrature components of the two orthogonally polarized analog output signals in a coordinated manner based on the largest of the output signals, means for amplifying the output signals by ganged variable gain to prevent signal clipping between an intermediate output signal level and a maximum signal level, and means for providing a maximum fixed gain for linear signal operation between an intermediate signal level and the lowest operating signal output level.

6. The digital adaptive suppression system of claim 4 wherein said analog-to-digital converter comprises means for sampling said pair of power-regulated analog signals in quadrature and for digitizing the samples to generate said digital inputs, said digital inputs represented as digital input signal vectors.

7. The digital adaptive suppression system of claim 6 wherein said digital polarimeter numerically processes the digital input signal vectors with the digital phase shifting coefficients to obtain a numeric output signal.

8. The digital adaptive suppression system of claim 7 wherein said numeric output signal is provided to said coefficient generator to update the digital phase shifting coefficients.

9. The digital adaptive suppression system of claim 8 wherein said coefficient generator includes means for continuously updating the digital phase shifting coefficients until said numeric output signal is minimized.

10. The digital adaptive suppression system of claim 7 further comprising a digital adaptive transversal filter connected with said digital polarimeter for receiving the numeric output signal, for processing the numeric output signal in accordance with a finite impulse response (FIR) filtering algorithm, and for coupling the filtered numeric output signal to said coefficient generator.

11. The digital adaptive suppression system of claim 10 wherein said coefficient generator processes the filtered numeric output signal to generate and repetitively update the phase shifting coefficients.

12. The digital adaptive suppression system of claim 11 wherein said digital adaptive transversal filter minimizes narrow-band interference signals.

13. The digital adaptive suppression system of claim 7 wherein said numerical processing of the digital input signal vectors with the digital phase shifting coefficients is in accordance with the following:

$$\Delta = \begin{bmatrix} a_{11} & a_{12} \\ a_{21} & a_{22} \end{bmatrix} \begin{bmatrix} x_1 \\ x_2 \end{bmatrix} + \begin{bmatrix} b_{11} & b_{12} \\ b_{21} & b_{22} \end{bmatrix} \begin{bmatrix} y_1 \\ y_2 \end{bmatrix}$$

where $\Delta$ is the numeric output signal, the vectors $$\begin{bmatrix} x_1 \\ x_2 \end{bmatrix} \text{ and } \begin{bmatrix} y_1 \\ y_2 \end{bmatrix}$$

are the digital input signal vectors, and $$\begin{bmatrix} a_{11} & a_{12} \\ a_{21} & a_{22} \end{bmatrix} \text{ and } \begin{bmatrix} b_{11} & b_{12} \\ b_{21} & b_{22} \end{bmatrix}$$

are the digital phase shifting coefficients, in vector form, from said coefficient generator.

14. The digital adaptive suppression system of claim 13 wherein said vector form digital phase shifting coefficients are generated by said coefficient generator in accordance with the following:

$a_{11} = -\sin \gamma$ $a_{12} = -\cos \gamma - 1$ $a_{21} = \cos \gamma + 1$ $a_{22} = -\sin \gamma$ $b_{11} = \cos \gamma \cos \phi - \sin \gamma \sin \phi - \cos \phi$ $b_{12} = -\cos \gamma \sin \phi - \sin \gamma \cos \phi + \sin \phi$ $b_{21} = \sin \gamma \cos \phi + \cos \gamma \sin \phi - \sin \phi$ $b_{22} = -\sin \gamma \sin \phi + \cos \gamma \cos \phi$ where $\gamma$ and $\phi$ values are continuously updated by said coefficient generator until the numeric output signal is minimized.

* * * * *